(12) United States Patent  
Shin

(10) Patent No.: US 7,885,163 B2  
(45) Date of Patent: Feb. 8, 2011

(54) OPTICAL PICKUP, RECORDING/REPRODUCING APPARATUS AND RECORDING/REPRODUCING METHOD

(75) Inventor: Yun Sup Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 386 days.

(21) Appl. No.: 12/114,493

(22) Filed: May 2, 2008

(65) Prior Publication Data

US 2008/0279082 A1    Nov. 13, 2008

(30) Foreign Application Priority Data

May 4, 2007   (KR) ................. 10-2007-0043477  
Jul. 2, 2007   (KR) ................. 10-2007-0066067  
Jul. 11, 2007  (KR) ................. 10-2007-0069695

(51) Int. Cl.  
*G11B 7/00* (2006.01)

(52) U.S. Cl. ............. 369/100; 369/109.02; 369/110.02; 369/112.01

(58) Field of Classification Search ........ 369/1, 369/2, 3, 22, 100, 94, 109.02, 53.26, 112.02, 369/112.08, 112.16  
See application file for complete search history.

(56) References Cited

U.S. PATENT DOCUMENTS

| | | | |
|---|---|---|---|
| 5,559,784 A * | 9/1996 | Ota | 369/94 |
| 6,674,059 B1 * | 1/2004 | Nakano | 250/201.5 |
| 7,724,409 B2 * | 5/2010 | Lin et al. | 359/22 |
| 7,760,606 B2 * | 7/2010 | Yanagawa et al. | 369/53.26 |
| 2003/0185137 A1 * | 10/2003 | Horinouchi et al. | 369/112.22 |
| 2004/0037204 A1 * | 2/2004 | Takeuchi | 369/112.08 |
| 2004/0257961 A1 * | 12/2004 | Nishi et al. | 369/112.16 |
| 2005/0135218 A1 * | 6/2005 | Akiyama et al. | 369/112.02 |
| 2005/0276203 A1 * | 12/2005 | Heor et al. | 369/112.02 |
| 2006/0077860 A1 * | 4/2006 | Nagatomi et al. | 369/112.03 |
| 2006/0104181 A1 * | 5/2006 | Tabuchi | 369/112.01 |

FOREIGN PATENT DOCUMENTS

| | | |
|---|---|---|
| EP | 1 713 066 A2 | 10/2006 |
| JP | 2004-39171 A | 2/2004 |
| JP | 2004-296082 A | 10/2004 |

* cited by examiner

*Primary Examiner*—Thuy N Pardo  
(74) *Attorney, Agent, or Firm*—Birch, Stewart, Kolasch & Birch, LLP

(57) ABSTRACT

A recording medium, a recording/reproducing apparatus, and a recording/reproducing method are disclosed. The apparatus uses the number of record layers contained in a recording medium and a multi-wavelength light source including a plurality of optical signals having different wavelengths, and irradiates an optical signal emitted from a light source on each recording medium according to wavelengths of the light beams. As a result, the apparatus can effectively gain access to the recording medium including a plurality of record layers, such that it can simultaneously record/reproduce data in/from the recording medium.

43 Claims, 30 Drawing Sheets

(a)

(b)

(c)

OPTICAL PICKUP, RECORDING/REPRODUCING APPARATUS AND RECORDING/REPRODUCING METHOD

This application claims the benefit of Korean Patent Applications No. 10-2007-0043477, filed on May 4, 2007, No. 10-2007-0066067, filed on Jul. 2, 2007, and No. 10-2007-0069695, filed on Jul. 11, 2007, which are hereby incorporated by reference as if fully set forth herein.

BACKGROUND OF THE INVENTION

1. Field of the Invention

The present invention relates to an optical pickup device, a recording/reproducing apparatus, and a recording/reproducing method, and more particularly to an optical pickup device, a recording/reproducing apparatus, and a recording/reproducing method, which are available for a recording medium equipped with a plurality of record layers.

2. Discussion of the Related Art

Generally, a recording/reproducing apparatus records/reproduces data in/from a recording medium using an optical signal and information of various disc types. Recently, with the increasing development of a new technique capable of processing high-quality moving images or another technique capable of compressing such moving images, the demand of developing a high-density recording medium rapidly increases.

For this purpose, there has recently been developed a variety of high-density recording medium technologies, for example, a Blu-ray Disc (BD) based on a short-wavelength blue ray, a high-density DVD (HD-DVD), and a near field recording (NFR) unit based on near field optics.

In order to effectively record/reproduce data in/from the above-mentioned high-density disc, the high-density disc has been designed to have a plurality of record layers. Therefore, there is needed a method for effectively accessing the above record layers.

A data transfer rate (DTR) must be guaranteed as an effective optical system for processing a large amount of data. In this case, increasing a rotation speed of the recording medium is physically limited, such that a method for increasing the data transfer rate using multiple optical signals is needed.

Also, the near field recording (NFR) device uses a lens having near-field characteristics. As a result, there is needed a method for allowing the above-mentioned near field recording (NFR) device to be compatible with the conventional recording medium.

SUMMARY OF THE INVENTION

Accordingly, the present invention is directed to an optical pickup device, a recording/reproducing apparatus, and a recording/reproducing method that substantially obviate one or more problems due to limitations and disadvantages of the related art.

An object of the present invention is to provide a method for effectively accessing a recording medium including a plurality of record layers.

Another object of the present invention is to provide a method for simultaneously recording or reproducing data in/from a recording medium.

Another object of the present invention is to provide a method for recording/reproducing data in/from a recording medium using optical polarization characteristics and different lenses.

Another object of the present invention is to provide a method for simultaneously processing data using optical signals having different polarizations, thereby increasing a data processing rate.

Another object of the present invention is to provide a method and apparatus for simultaneously recording or reproducing data in/from a recording medium using two optical signals having different polarizations.

Another object of the present invention is to provide an optical system capable of using individual lenses using lenses having different characteristics, and a recording/reproducing apparatus for use in the optical system.

Another object of the present invention is to provide an optical system capable of using individual lenses using lenses having different characteristics, and a recording/reproducing apparatus for use in the optical system.

Another object of the present invention is to provide a near field recording (NFR) apparatus which can be compatible with a conventional far-field recording medium.

Another object of the present invention is to provide a recording/reproducing method capable of using different lenses using polarization.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an optical pickup apparatus comprises: a light source configured to generate a light beam; an optical-path adjusting unit configured to adjust a path of the light beam to be irradiated on different record layers contained in a recording medium; and a light receiving unit configured to receive the light beam reflected from the recording medium.

The light source generates a plurality of light beams having different wavelengths; and the optical-path adjusting unit includes: a wavelength splitter configured to separate the light beams emitted from the light source according to wavelengths of the light beams, and a diffraction unit configured to diffract the light beam reflected from the recording medium at different angles according to the wavelengths of the light beams.

The wavelength splitter passes through a light beam having a specific wavelength, and splits the remaining light beams other than the light beam into different paths according to individual phases.

The wavelength splitter forms grooves on its surface, such that it passes the light beam incident to the wavelength splitter or diffracts the light beam in different directions according to wavelengths of the light beams.

The wavelength splitter maintains or diverts the optical path, such that the light beams having different wavelengths are irradiated on the record layers of the recording medium, respectively.

An interval between focal points of the light beams irradiated on different positions of the recording medium according to wavelengths of the light beams corresponds to an interval between the record layers of the recording medium.

The light source generates a first light beam having a first wavelength and a second light beam having a second wavelength different from the first wavelength, and a difference between the first wavelength and the second wavelength is determined to a predetermined value by which the first light beam and the second light beam are irradiated on different record layers of the recording medium, respectively.

The light receiving unit receives the light beam reflected from the recording medium, generates an electric signal corresponding to the received light beam, and separately receives the light beams separated by the diffraction unit.

The light receiving unit includes a plurality of light receiving elements corresponding to the number of light beams.

The optical pickup apparatus further comprises: a beam splitter configured to separate individual paths of the light beams from each other according to polarization directions, or synthesizing the individual paths of the light beam beams.

The light source emits two light beams polarized in different directions; the optical-path adjusting unit includes: a beam splitter configured to output the two light beams according to their polarization directions; and first and second lens units which enable the light beams received from the beam splitter to be irradiated on different positions of the recording medium, and the light receiving unit includes a first light receiving unit which receives a reflected light beam from the first lens unit after the light beam has been reflected from the recording medium, and a second light receiving unit which receives a reflected light beam from the second lens unit after the light beam has been reflected from the recording medium.

Each of the first lens unit and the second lens unit includes an objective lens and a high-refraction lens having a refraction index higher than that of the objective lens.

The second light receiving unit receives a light beam having a distorted-polarization direction, in which the light beam is incident to the first lens unit or the second lens unit.

The second receiving part generates a specific signal corresponding to a quantity of the distorted light received in the second light receiving unit itself, in which the specific signal is used to generate a gap-error (GE) signal which controls a first interval between the first lens unit and the recording medium or a second interval between the second lens unit and the recording medium.

The optical pickup apparatus further comprises: a lens driver configured to drive the first lens unit or the second lens unit according to the gap-error (GE) signal.

The optical pickup apparatus separately receives the distorted light beam from the first lens unit and the other distorted light beam from the second lens unit, and outputs electric signals which generate a first gap-error signal and a second gap-error signal, respectively, and the lens driver includes a first driver configured to drive the first lens unit using the first gap-error signal, and a second driver configured to drive the second lens unit using the second gap-error signal.

The two light beams polarized in different directions have polarization directions perpendicular to each other.

The optical pickup apparatus further comprises: a first focus adjusting unit configured to adjust a light-focusing position on the recording medium using the first lens unit; and a second focus adjusting unit configured to adjust a light-focusing position on the recording medium using the second lens unit.

Each of the first focus adjusting unit and the second focus adjusting unit includes at least two lenses to adjust an angle of the incident light beam.

The optical-path adjusting unit includes: a polarization adjusting unit configured to receive the light beam from the light source, and outputting a light beam having a predetermined polarization direction; a beam splitter configured to output the light beam according to the polarization direction of the light beam outputted from the polarization adjusting unit; and first and second lens units which enable the light beam received from the beam splitter to be irradiated on different positions of the recording medium.

The polarization adjusting unit determines the polarization direction of the output light beam according to a applied voltage value.

The polarization adjusting unit includes a plurality of polar molecules.

The polarization adjusting unit includes a liquid crystal, constituent molecules of which are differently arranged according to the applied voltage.

The polarization direction of the light beam passing through the polarization adjusting unit rotates by 90° according to the presence or absence of the applied voltage.

The beam splitter, if there is no applied voltage, receives a light beam from the polarization adjusting unit, and outputs the received light beam to the first lens unit; and the beam splitter, if the applied voltage exists, receives a light beam from the polarization adjusting unit, and outputs the received light beam to the second lens unit.

At least one of the first lens unit and the second lens unit is a near-field lens, which includes an objective lens and a high-refraction lens having a refraction index higher than that of the objective lens.

The optical pickup apparatus further comprises: a first light receiving unit configured to receive the light beam reflected from the recording medium, and generating a recording/reproducing signal for recording/reproducing data; and a second light receiving unit configured to receive the remaining reflected light beams which are not incident to the first light receiving unit, and generating an interval-control signal configured to control an interval between the near-field lens and the recording medium.

The optical pickup apparatus further comprises: a focus adjusting unit which includes at least two lenses to adjust an incident angle of the light beam incident to the near-field lens, and adjusts a focal length using the light beam passing through the near-field lens.

In another aspect of the present invention, there is provided an recording/reproducing apparatus comprising: an optical pickup unit for irradiating a light beam on a recording medium to detect an optical signal; a signal generator configured to generate a control signal using the optical signal; and a controller configured to control the optical pickup unit according to the control signal, wherein the optical pickup unit includes a light source configured to generate a light beam, an optical-path adjusting unit configured to adjust a path of the light beam to be irradiated on different record layers contained in a recording medium, and a light receiving unit configured to receive the light bean reflected from the recording medium.

The light source generates a plurality of light beams having different wavelengths; and the optical-path adjusting unit includes: a wavelength splitter configured to separate the light beams emitted from the light source according to wavelengths of the light beams, and a diffraction unit configured to diffract the light beam reflected from the recording medium at different angles according to the wavelengths of the light beams.

The light source emits two light beams polarized in different directions; the optical-path adjusting unit includes: a beam splitter configured to output the light beams emitted from the light source according to their polarization directions; and first and second lens units which enable the light beams received from the beam splitter to be irradiated on different positions of the recording medium, and the light receiving unit includes a first light receiving unit which receives a reflected light beam from the first lens unit after the light beam has been reflected from the recording medium, and a second light receiving unit which receives a reflected light beam from the second lens unit after the light beam has been reflected from the recording medium.

The optical-path adjusting unit includes: a polarization adjusting unit configured to receive the light beam from the light source, and outputting a light beam having a predetermined polarization direction; a beam splitter configured to output the light beam according to the polarization direction of the light beam outputted from the polarization adjusting unit; and first and second lens units which enable the light beam received from the beam splitter to be irradiated on different positions of the recording medium.

The controller discriminates the recording medium, and controls a voltage signal applied to the polarization adjusting unit according to the discriminated result of the recording medium.

The controller controls ON or OFF operation of the voltage signal applied to the polarization adjusting unit.

the controller discriminates a type of the recording medium on the basis of the reflected light beam acquired when the recording medium is light-scanned.

In another aspect of the present invention, there is provided a recording/reproducing method comprising: a) generating a light beam; b) adjusting a path of the light beam, and irradiating the light beam on each of a plurality of record layers contained in a recording medium; and c) recording data in individual record layers or reproducing the data recorded in the individual record layers, using light beams reflected from the individual record layers.

The generating step a) includes the step of generating a plurality of light beams having different wavelengths, which correspond to the number of the record layers and an interval between the record layers; and the irradiating step b) includes the step of irradiating the a plurality of light beams on different record layers of the recording medium according to the wavelengths of the light beams.

The method further comprises: diffracting the light beams having different wavelengths in different directions according to the wavelengths of the light beams, such that focal points of the light beams irradiated on the recording medium are placed on the individual record layers of the recording medium.

The method further comprises: selecting a light source suitable for a type of the recording medium.

The method further comprises: simultaneously recording and reproducing data in/from the a plurality of record layers.

The generating step a) includes the step of generating two light beams polarized in different directions; the irradiating step b) includes the step of irradiating the two light beams on the recording medium according to their polarization directions; and the recording or reproducing step c) includes the step of simultaneously recording or reproducing data in the recording medium using the two light beams.

The method further comprises: adjusting light-focusing positions of the two light beams focused on the recording medium.

The method further comprises: receiving either one of the two light beams, and generating a gap-error signal.

The gap-error signal receives a distorted reflected light beam having a distorted polarization direction from among the reflected light beams, and generates the distorted reflected light beam.

The gap-error signal is proportional to an interval between a lens unit and the recording medium within a near-field limit.

The method further comprises: forming a near field using an objective lens and a high-refraction lens having a refraction index higher than that of the objective lens.

The two light beams polarized in different directions have polarization directions perpendicular to each other.

The irradiating step b) includes the steps of determining a type of the recording medium, adjusting a polarization direction of the light beam according to the determined result of the recording medium, and irradiating the adjusted light beam on the recording medium.

The method further comprises: focus-scanning the light beam irradiated on the recording medium; and determining a type of the recording medium using the reflected light beam detected in the focus-scanning process.

The method further comprises: adjusting the polarization direction according to a applied voltage.

The method further comprises: rotating the polarization direction by 90° according to the presence or absence of the applied voltage.

The optical pickup device, the recording/reproducing method, and the recording/reproducing apparatus according to the present invention have the following effects.

The present invention can effectively access a recording medium including a plurality of record layers.

The present invention can simultaneously record/reproduce data in/from a plurality of record layers of a recording medium.

The present invention can record or reproduce data in/from a recording medium using optical polarization characteristics and different lens units.

The present invention can simultaneously process data using optical signals having different polarizations, such that it increases a data processing rate.

The present invention can simultaneously record or reproduce data in/from a recording medium using two optical signals having different polarizations, such that it increases a recording/reproducing rate.

The present invention provides an optical system capable of using individual lenses using lenses having different characteristics, and a recording/reproducing apparatus for use in the optical system.

The present invention provides a near field recording (NFR) apparatus which can be compatible with a conventional far-field recording medium.

The present invention provides a recording/reproducing method capable of using different lenses using polarization.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

An optical pickup device, a recording/reproducing apparatus, and a recording/reproducing method according to the present invention will hereinafter be described with reference to the annexed drawings.

The term "recording medium" for use in the present invention is indicative of all recordable mediums (e.g., optical discs) according to various recording schemes. For the convenience of description and better understanding of the present invention, the optical disc will hereinafter be exemplarily used as the above-mentioned recording medium in the present invention. It should be noted that technical ideas of the present invention can be applied to other recording mediums without departing from the scope and spirit of the invention. The term "recording/reproducing apparatus" for use in the present invention is indicative of all kinds of devices which can record or reproduce data in/from a recording medium. The term "optical pickup unit" is indicative of an apparatus equipped with an optical system capable of recording/reproducing data in/from a recording medium Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

The optical pickup device according to the present invention will hereinafter be described in detail. Wherever possible, the same reference numbers will be used throughout the drawings to refer to the same or like parts.

Figure 1:
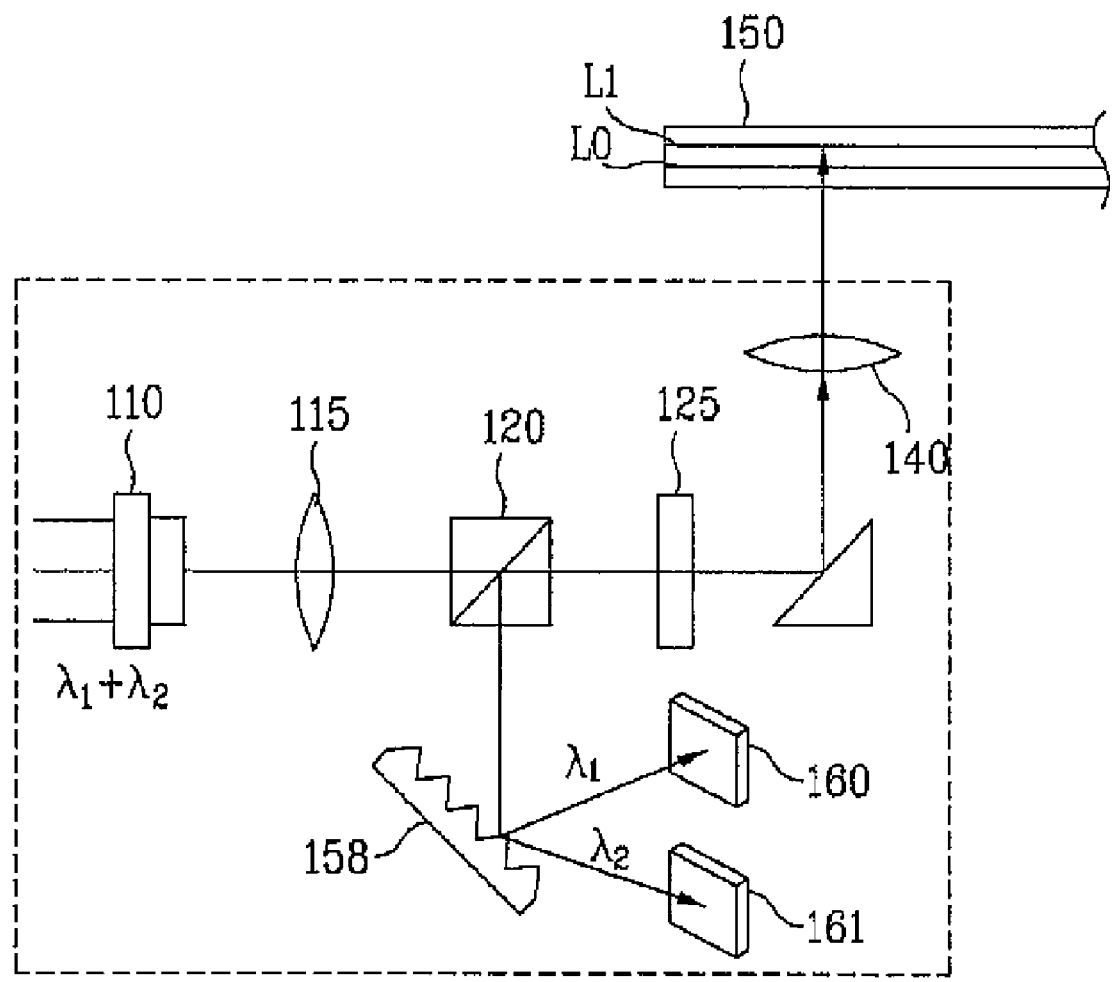
FIG. 1 is a schematic diagram illustrating an optical pickup device according to the present invention.

FIG. 1 is a schematic diagram illustrating an optical pickup device according to the present invention. The optical pickup device includes a light source 110, a collimating lens 115, a non-polarized beam splitter 120, a wavelength splitter 125, a lens unit 140, a diffraction unit 158, and light receiving units 160 and 161.

The light source 110 may be set to a laser having excellent straightness. In more detail, the light source 110 may be implemented with a laser diode. In this case, the light source 110 is used as a multi-wavelength light source capable of generating a plurality of optical signals having different wavelengths. That is, the light source 110 includes a plurality of optical signals. The optical signals correspond to not only the number of record layers contained in the recording medium but also intervals among the record layers.

For example, a light source 110 having two wavelengths may be applied to a recording medium including two record layers. That is, the light source 110 may include a first optical signal of a first wavelength λ1 and a second optical signal of a second wavelength λ2. The difference between the first wavelength λ1 and the second wavelength λ2 is decided by an interval between record layers contained in the recording medium.

In the case of a blu-ray disc (BD), an interval between record layers is 20 μm. In a near-field recording medium, an interval between record layers is a plurality of micrometers μm. In this way, there is a difference in wavelength between the BD and the near-field recording medium due to different intervals between record layers. Also, the light source 110 may be implemented with various kinds of light sources according to the types of a recording medium 150, such that the lights sources having different wavelengths can be selectively used according to the types of the recording medium 150.

The light beam, which emerges from the light source 110 and is irradiated on the recording medium, may be a parallel light beam. Therefore, the optical pickup device may include a lens (e.g., a collimating lens 115) which converts a light beam emerged from the light source 110 into a parallel light beam.

The non-polarized beam splitter 120 separates light beams incident from the same direction from each other, or synthesizes other light beams incident from different directions. In a preferred embodiment of the present invention, the non-polarized beam splitter 120 passes only horizontal polarization components simultaneously while reflecting vertical polarization components. However, if required, the non-polarized beam splitter 120 may pass only vertical polarization components simultaneously while reflecting horizontal polarization components.

The wavelength splitter 125 converts an optical path into another path according to a wavelength of an incident beam, and compensates for aberration such as spherical aberration of a light beam, which is irradiated on the recording medium 150 via the lens unit 140. For example, the wavelength splitter 125 passes a light beam of a specific wavelength, and diffracts the remaining light beams other than the above light beam. In more detail, the wavelength splitter 125 may form grooves of various patterns on a Fresnel lens, parallel gratings, concentric-circular gratings, or other-patterned gratings may be formed on the Fresnel lens. As a result, the wavelength splitter 125 determines incident beams to have different phases according to their wavelengths, such that it diffracts the above incident beams in different directions according to their wavelengths.

In this case, the wavelength splitter 125 induces the optical path to be changed according to a wavelength of a light beam. Although the wavelength splitter 125 has been implemented with the Fresnel lens as an example, the wavelength splitter 125 is not limited to the Fresnel lens, and can also be implemented with other examples as necessary. For example, a holographic optical element (HOE) capable of compensating for chromatic aberration for each wavelength may also be used as the wavelength splitter 125.

The lens unit 140 irradiates the light beam on the recording medium 150, and condenses the light beam reflected from the recording medium 150. For this purpose, the lens unit 140 may be configured in the form of a convex lens, and may also have other types instead of the convex type.

The diffraction unit 158 diffracts the incident light beam at different angles according to wavelengths of the light beams. The diffraction unit 158 has a grating structure of a specific pattern, such that the light beam is diffracted at different angles according to wavelengths of the light beams.

The light receiving units 160 and 161 receive the reflected light beam, perform photoelectric conversion on the received light beam, and generate an electric signal corresponding to a quantity of light of the reflected light beam. In this embodiment, the present invention exemplarily includes a first light receiving unit 160 and a second light receiving unit 161 for the convenience of description and better understanding of the present invention. The first light receiving unit 160 and the second light receiving unit 170 may be implemented with two light receiving elements PDA and PDB, each of which splits into a predetermined number of sections (e.g., 2-section) in either a signal track direction or a radial direction of the recording medium 150. In this case, the light receiving units PDA and PDE output electric signals (a,b) proportional to the received light quantity, respectively. Otherwise, the light receiving units 160 and 170 may also be implemented with four light receiving elements PDA, PDB, PDC, and PDD, each of which splits into a predetermined number of sections (e.g., 4-section) in either a signal track direction or a radial direction of the recording medium 150. In this case, the light receiving elements contained in the light receiving unit 160 or 161 are not limited to the above-mentioned examples, and can also be implemented with other modifications as necessary.

The order of operations of the optical pickup device on the basis of a traveling direction of the light beam emerged from the light source 110 will hereinafter be described in detail.

The light beam emerged from the light source 110 of the optical pickup device passes through the collimating lens 115, such that it is converted into a parallel light beam. The light beam is incident on the non-polarized beam splitter 120, some parts of the incident light beam are reflected, and the remaining parts other than the reflected beam pass through the non-polarized beam splitter 120, resulting in the occurrence of separation of a path of the light beam. For example, the non-polarized beam splitter 120 may pass horizontal polarization components of the linearly-polarized beam, and may reflect vertical polarization components thereof, or vice versa. The optical path passing through the non-polarized beam splitter 120 may further include a polarizing conversion plane (not shown), and the polarizing conversion plane will hereinafter be described in detail.

The light beam, which has passed through the non-polarized beam splitter 120, enters the wavelength splitter 125, such that the resultant light beam received from the wavelength splitter 125 is diffracted into different directions according to wavelengths of the light beams, resulting in the diffracted light beams are separated from each other. For example, the wavelength splitter 125 passes only a light beam of a wavelength λ1, and diffracts other light beams other than the light beam. Detailed descriptions will hereinafter be described with reference to FIG. 2.

Figure 2:
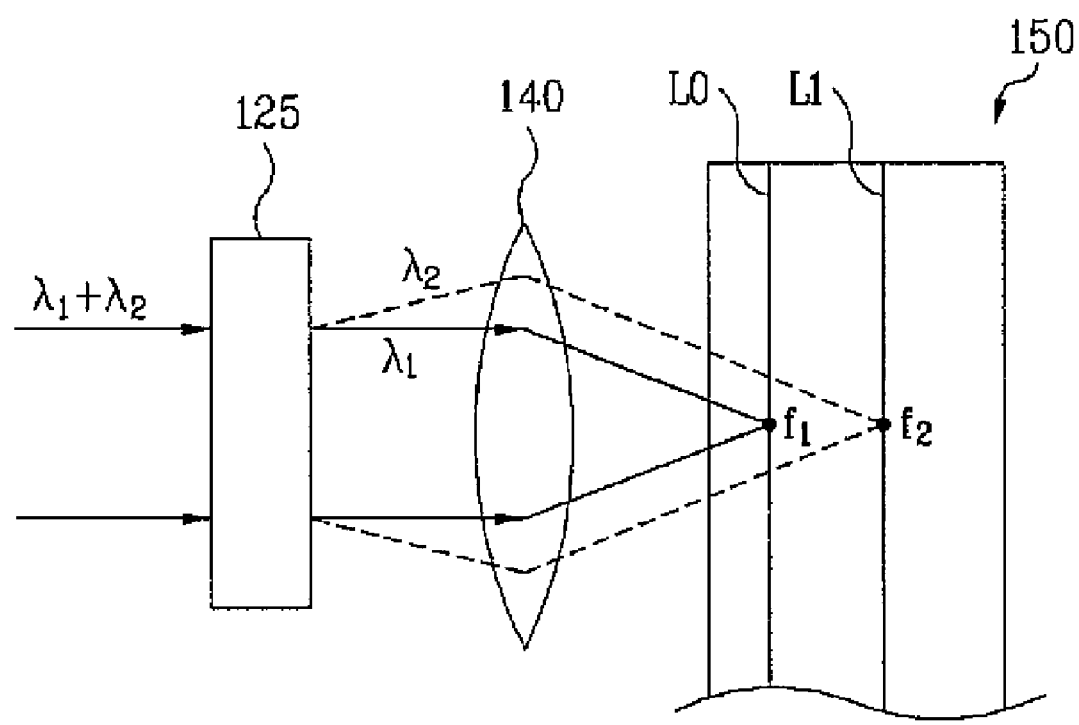
FIG. 2 is a conceptual diagram illustrating a wavelength splitter along with a recording medium according to the present invention.

FIG. 2 is a conceptual diagram illustrating a wavelength splitter along with a recording medium according to the present invention.

Referring to FIG. 2, provided that the light source includes a first light beam having a first wavelength λ1 and a second light beam having a second wavelength λ2, the light beam is incident on the wavelength splitter 125, the light beam of the wavelength λ1 passes through the wavelength splitter 125, such that it is converted into a parallel light beam denoted by a solid line. This parallel light beam is incident on the lens unit 140, such that a focal point f1 is formed on a first record layer L0 of the recording medium 150.

In the meantime, the second light beam of the second wavelength λ2 is diffracted by the wavelength splitter 125, such that the traveling direction of the light beam is changed as denoted by a dotted line. The changed light beam is incident on the lens unit 140, such that a focal point f2 is formed on a second record layer L1 of the recording medium 150.

If the recording medium 150 includes three record layers, the light source 110 includes first to third light beams having first to third wavelengths λ1, λ2, and λ3 respectively. The wavelength splitter 125 passes the first light beam of the first wavelength λ1. Since the second wavelength λ2 is different from the third wavelength λ3, the wavelength splitter 125 recognizes the second and third wavelengths λ2 and λ3 as different phases, such that it diffracts the second and third light beams into different directions.

Therefore, the second and third wavelengths λ2 and λ3 are separated from each other, such that the second and third light beams having the second and third wavelengths λ2 and λ3 may be irradiated on different record layers. For the convenience of description, the following embodiment may include only the first and second wavelengths λ1 and λ2 for only illustrative purposes.

As described above, the light beam, which has been irradiated on and reflected from different record layers of the recording medium 150, is condensed by the lens unit 140. In this case, the polarizing conversion plane (not shown) may be further contained in the optical path incident to the non-polarized beam splitter 120. The polarizing conversion plane converts a polarizing direction of the light beam incident on the recording medium 150 into another direction, and also converts a polarizing direction of the light beam reflected from the recording medium 150 into another direction. For example, in the case of using a quarter wave plate (QWP) as a polarizing conversion plane, the quarter wave plate performs left-hand circular polarization (LHCP) of the light beam incident to the recording medium 150, and performs right-hand circular polarization (RHCP) of the reflected light beam traveling in an inverse direction. As a result, the polarization direction of the reflected light beam received from the quarter wave plate is changed in another direction different from that of the incident light beam, and the above two polarization directions are 90 degrees out of phase with each other. Therefore, only horizontal polarization components pass through the non-polarized beam splitter 120, and are reflected from the recording medium 150. When the reflected light beam is incident on the non-polarized beam splitter 120, only vertical polarization components are incident to the non-polarized beam splitter 120. As a result, the reflected light beam having the vertical polarization components is reflected from the non-polarized beam splitter 120, and the resultant reflected light beam is incident on the diffraction unit 158.

The first light beam of the first wavelength λ1 and the second light beam of the second wavelength λ2 are diffracted at different angles. So, the first light beam of the first wavelength λ1 enters the first light receiving unit 160, and the second light beam of the second wavelength λ2 enters the second light receiving unit 161. By the above-mentioned processes, light beams having different wavelengths are irradiated on different record layers of the recording medium 150, such that data can be simultaneously recorded in or reproduced from individual record layers.

Figure 3:
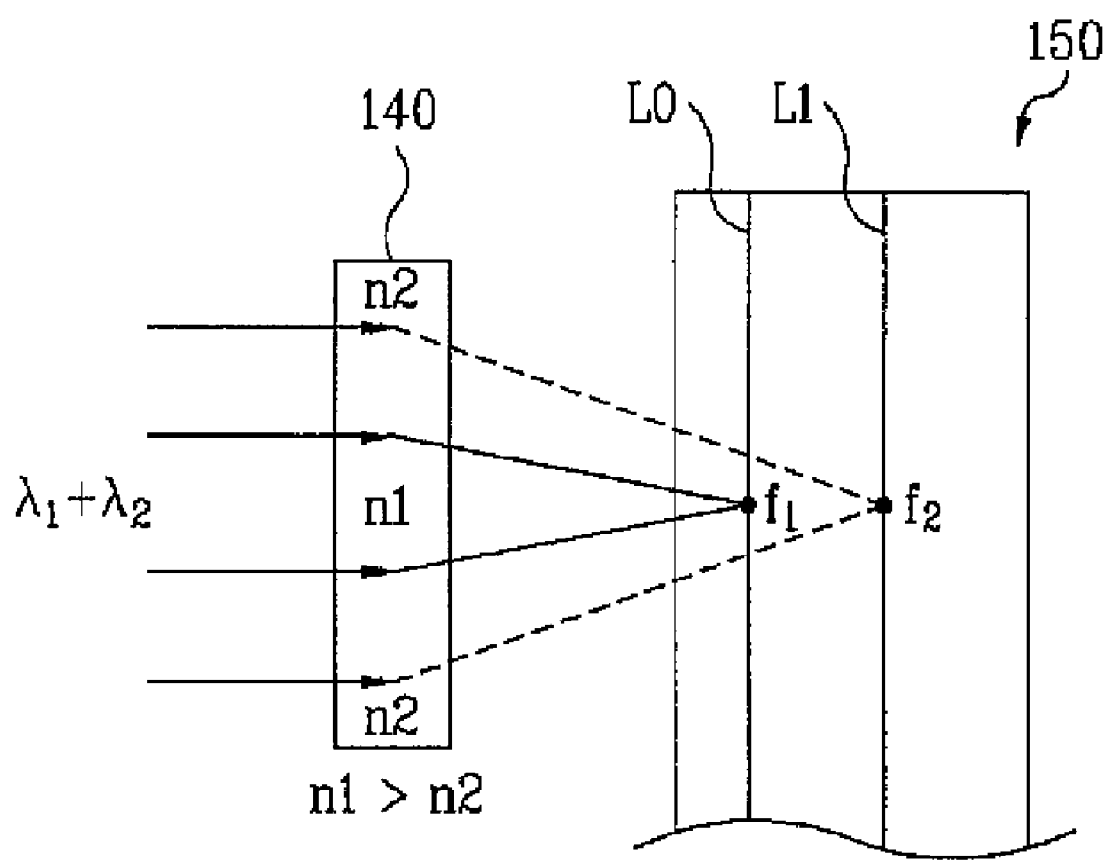
FIG. 3 is a cross-sectional view illustrating a lens unit along with a recording medium according to the present invention.

In the meantime, the optical pickup device may not include the wavelength splitter 125. In this case, light beams having different wavelengths contained in the light source 110 are correctly irradiated on individual record layers of the recording medium 150. That is, the wavelength of the light beam contained in the light source 110 may be correctly determined in consideration of an interval between record layers. In this case, the light beam irradiated on each record layer may have spherical aberration between a first light beam incident to a first position adjacent to the center of the lens unit 140 and a second light beam incident to a second position spaced apart from the center of the lens unit 140. In this case, light beams irradiated on a single record layer (e.g., L0) may not be focused on a single focal point. In order to compensate for the spherical aberration, the present invention may include a straight lens of FIG. 3 instead of the spherical lens. FIG. 3 is a cross-sectional view illustrating a lens unit along with a recording medium according to the present invention. In order to perform a light-condensing function of the lens unit 140, the closer the focal point is to the center of the straight lens, the higher the refractive index.

Figure 4:
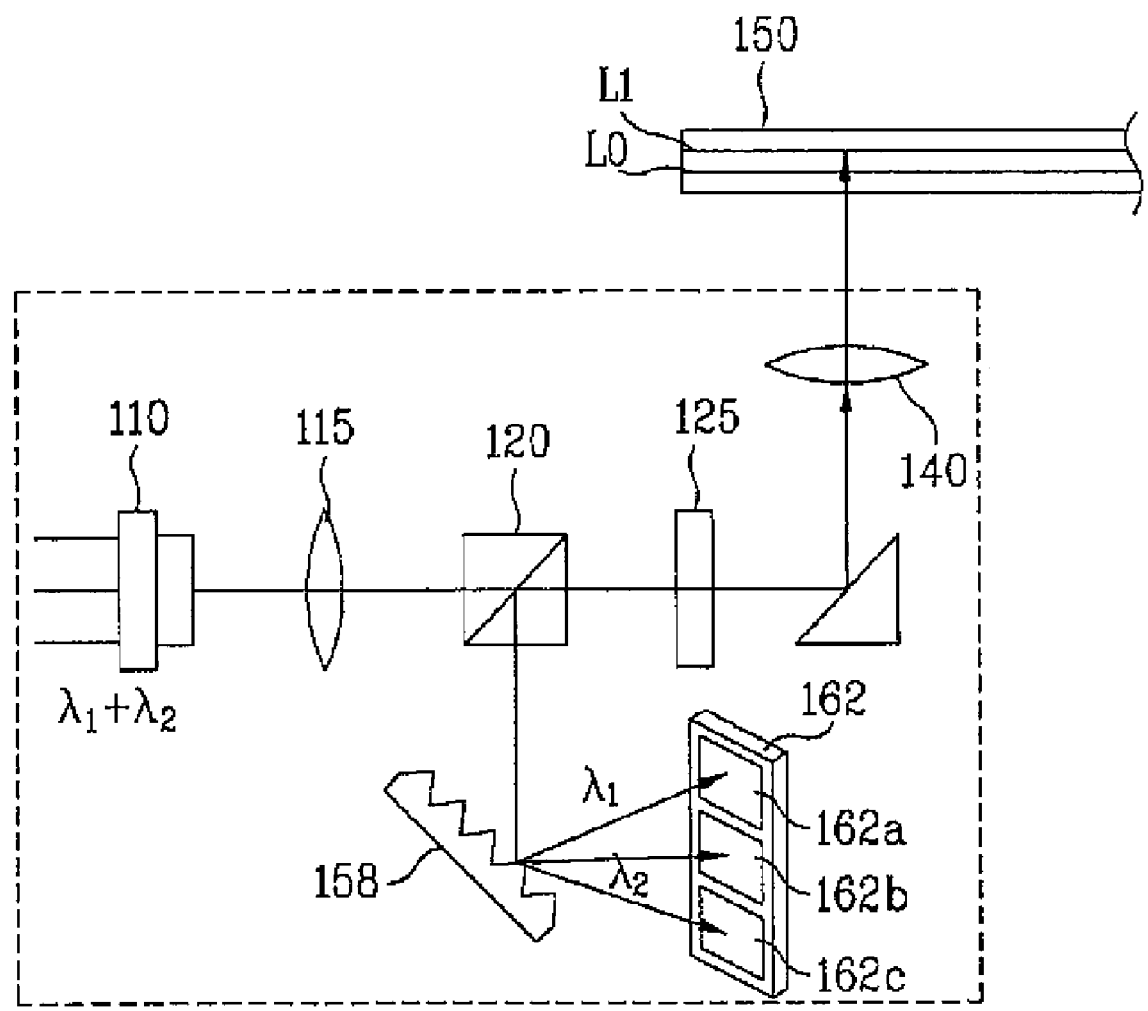
FIG. 4 is a schematic diagram illustrating an optical pickup device according to one embodiment of the present invention.

FIG. 4 is a schematic diagram illustrating an optical pickup device according to one embodiment of the present invention. Referring to FIG. 4, in the case of the optical pickup device according to this embodiment, the light receiving unit 162, which receives individual light beams having different wavelengths reflected from the recording medium 150, may be manufactured in the form of an integrated type. If there is a little difference in wavelength between light sources, there may also be a little difference in optical path between light beams diffracted by the diffraction unit 158. Therefore, the light receiving unit 162 may include a plurality of light receiving elements in a single panel. In the case of using a light source including a 3-wavelength light beam, the light receiving unit 162 may include a first light receiving element 162a, a second light receiving element 162b, and a third light receiving element 162c.

Figure 5:
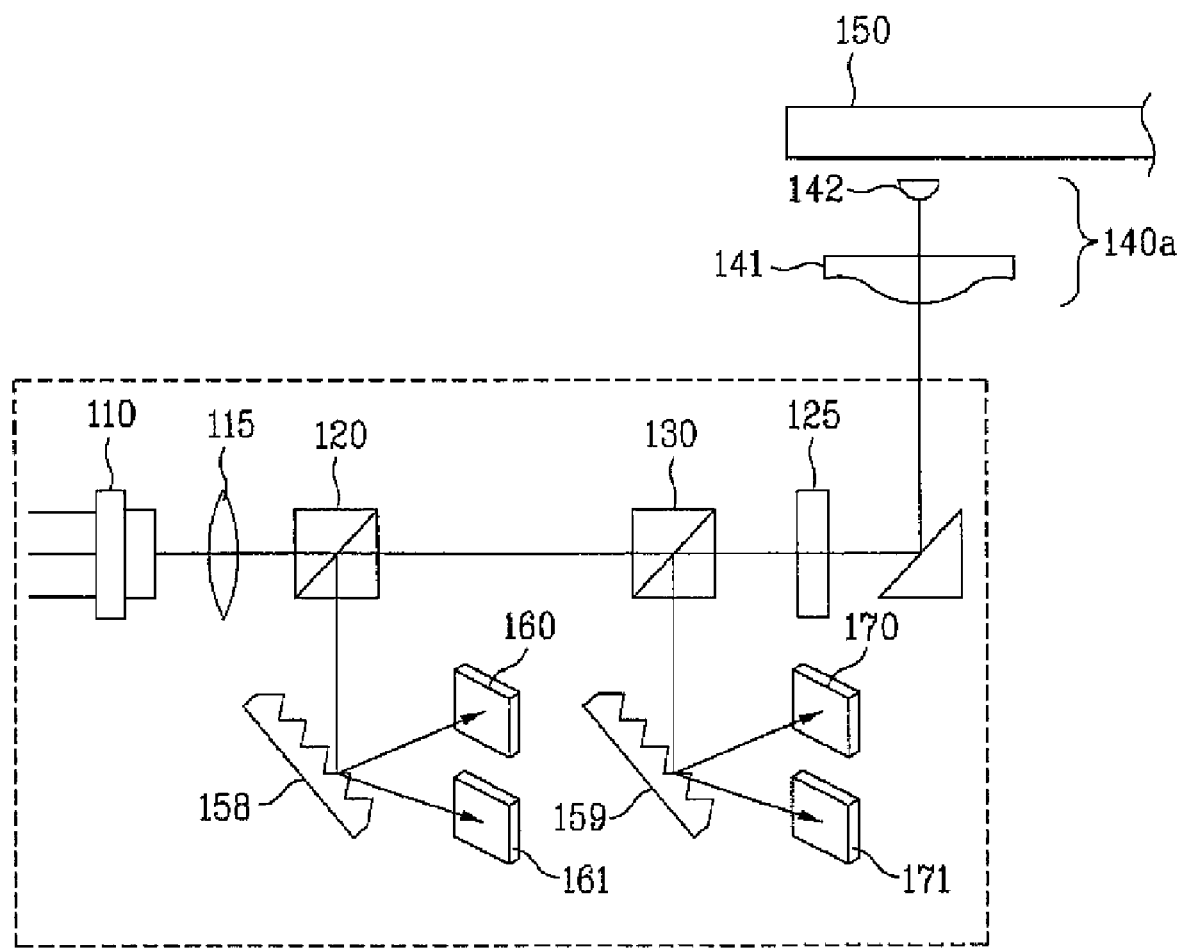
FIG. 5 is a schematic diagram illustrating an optical pickup device according to another embodiment of the present invention.

FIG. 5 is a schematic diagram illustrating an optical pickup device according to another embodiment of the present invention. Referring to FIG. 5, the optical pickup device according to this embodiment includes a light source 110, non-polarized and polarized beam splitters 120 and 130, a wavelength splitter 125, a lens unit 140a, diffraction units 158 and 159, and light receiving units 160, 161, 170, and 171.

In this case, the optical pickup device of FIG. 5 determines whether separation of the light beam is needed, such that it may include a plurality of light receiving units and a plurality of splitters according to the determined result. For the convenience of description, the optical pickup device of FIG. 5 may exemplarily include a non-polarized beam splitter (NEBS) 120 and a polarized beam splitter (PBS) 130. In this case, the light source 110 uses different wavelengths λ1 and λ2 for only illustrative purposes. For the convenience of description and better understanding of the present invention, the same parts as those of the previously-stated embodiment will herein be omitted, and only different parts will hereinafter be described.

The non-polarized beam splitter (NBS) 120 or the polarized beam splitter (PBS) 130 may separate light beams incident from the same direction from each other, or may synthesize other light beams incident from different directions. In this preferred embodiment, the present invention includes the non-polarized beam splitter (NBS) 120 and the polarized beam splitter (PBS) 130, such that their detailed descriptions will hereinafter be described in detail.

The non-polarized beam splitter (NBS) 120 passes only some parts of the incident light beam and reflects the remaining parts. In this embodiment, the above-mentioned non-polarized beam splitter (NBS) 120 may also be called a first polarized beam splitter. The polarized beam splitter (PBS) 130 passes only specific-directional polarization according to the polarization direction. In this embodiment, the above-mentioned polarized beam splitter (PBS) 130 may also be called a second polarized beam splitter. For example, in the case of using the straight polarization, the polarized beam splitter (PBS) 130 passes only horizontal polarization components and reflects vertical polarization components. Otherwise, the polarized beam splitter (PBS) 130 passes only vertical polarization components and reflects horizontal polarization components.

The lens unit 140a irradiates the light beam emitted from the light source 110 on the recording medium 150, and condenses the light beam reflected from the recording medium 150. In this embodiment, the lens unit 140a may include at least two lenses. In other words, besides the objective lens 141, the lens unit 140a further includes an additional lens of a high refractive index, such that a numerical aperture (NA) increases and Evanescent waves occur. For example, the lens unit 140a includes the objective lens and a high-refraction lens 142. The high-refraction lens is arranged on the optical path from the objective lens to the recording medium 150. The above-mentioned high-refraction lens 142 is hereinafter referred to as a "near-field lens".

In a recording/reproducing apparatus based on a near field, an optical system of the optical pickup device 110 including the lens unit 140a must be very close to the recording medium 150. The interval between the near field lens 142 and the recording medium 150 must be equal to or less than an interval denoted by nanometers.

For example, if the interval between the lens unit 140 and the recording medium 150 is equal to or less than about ¼ (i.e., $\lambda/4$) of an optical wavelength, some parts of the light beam, which has been received in the lens unit 140 at a threshold angle or more, are not fully reflected from the surface of the recording medium 150, and form Evanescent waves. The Evanescent waves pass through the recording medium 150, and arrive at record layers. These Evanescent waves arrived at the record layers may be used to record or reproduce data. As a result, by the light beam under the diffraction limit, high-density bit information can be stored in the recording medium. However, if the interval between the lens unit 140 and the recording medium 150 is longer than $\lambda/4$, the optical wavelength loses unique characteristics of Evanescent waves and returns to its original wavelength, and the light beam is fully reflected from the surface of either the recording medium 150 or the near field lens 142. In this case, the Evanescent waves cannot be formed, such that the recording/reproducing operation caused by the near field cannot be performed. Generally, in a near-field recording/reproducing apparatus, the interval between the lens unit 140 and the recording medium 150 is controlled to be less than about $\lambda/4$. Other constituent elements are the same as those of the above-mentioned embodiments.

The flow of the light beam according to this embodiment will hereinafter be described in detail. A multi-wavelength light beam (i.e., light beams having a plurality of wavelengths) emitted from the light resource 110 passes through the first polarized beam splitter 120 (i.e., a non-polarized beam splitter (NBS)), and enters the second polarized beam splitter (PBS) 130 (i.e., the polarized beam splitter (PBS)). In this case, all the light beams having different wavelengths enter the polarized beam splitter (PBS) 130 via the non-polarized beam splitter (NBS) 120 using the light source 110 polarized in a horizontal direction. The multi-wavelength light beam passing through the polarized beam splitter (PBS) 130 enters the wavelength splitter 125 is diffracted into different directions according to wavelengths of the light beams, such that the light beams having different wavelengths are separated from each other. In this case, the light beams having wavelengths of the light beams are irradiated on different record layers of the recording medium 150 via the lens unit 140a. A polarization direction of each light beam reflected from the recording medium 150 is converted into another polarization direction by a polarization conversion plane (not shown) as described above, and the resultant light beam is reflected from the polarized beam splitter (PBS) 130, such that the reflected light beam is incident to the second diffraction unit 159. The second diffraction unit 159 diffracts the light beams of wavelengths of the light beams into different directions, such that a first light beam is incident to the third light receiving unit 170 and a second light beam is incident to the fourth light receiving unit 171. The light beam received in the third light receiving unit 170 or the fourth light receiving unit 171 may be used to generate a recording/reproducing signal (RF) or a control signal (e.g., a tracking error (TE) signal) for a record layer from which the above light beam has been reflected.

In this case, the light beam passing through the high-refraction lens 142 is partially distorted, such that the distorted light beam passes through the polarized beam splitter (PBS) 130, and enters the first diffraction unit 158 via the non-polarized beam splitter (NBS) 120. The first diffraction unit 158 diffracts light beams of wavelengths of the light beams into different directions according to wavelengths of the light beams, such that the first light beam enters the first light receiving unit 170 and the second light beam enters the second light receiving unit 171. The light beams received in the first and second light receiving units 170 and 171 may be used to generate a gap-error (GE) signal capable of controlling record layers from which the above light beams have been reflected. In other words, the gap-error signal (GE) for controlling the interval between the lens unit 140a and the recording medium 150 or a tilt error signal (TE2) for controlling a tilt between the lens unit 140a and the recording medium 150 may be generated.

A near-field recording/reproducing apparatus including the optical pickup device of FIG. 5 according to one embodiment of the present invention will hereinafter be described in detail. For the convenience of description and better understanding of the present invention, the near-field recording/reproducing apparatus will hereinafter be described as an example of the present invention, but it should be noted that the scope of the present invention is not limited to only the near-field recording/reproducing apparatus, and can also be applied to other examples as necessary without departing from the spirit or scope of the invention.

Figure 6:
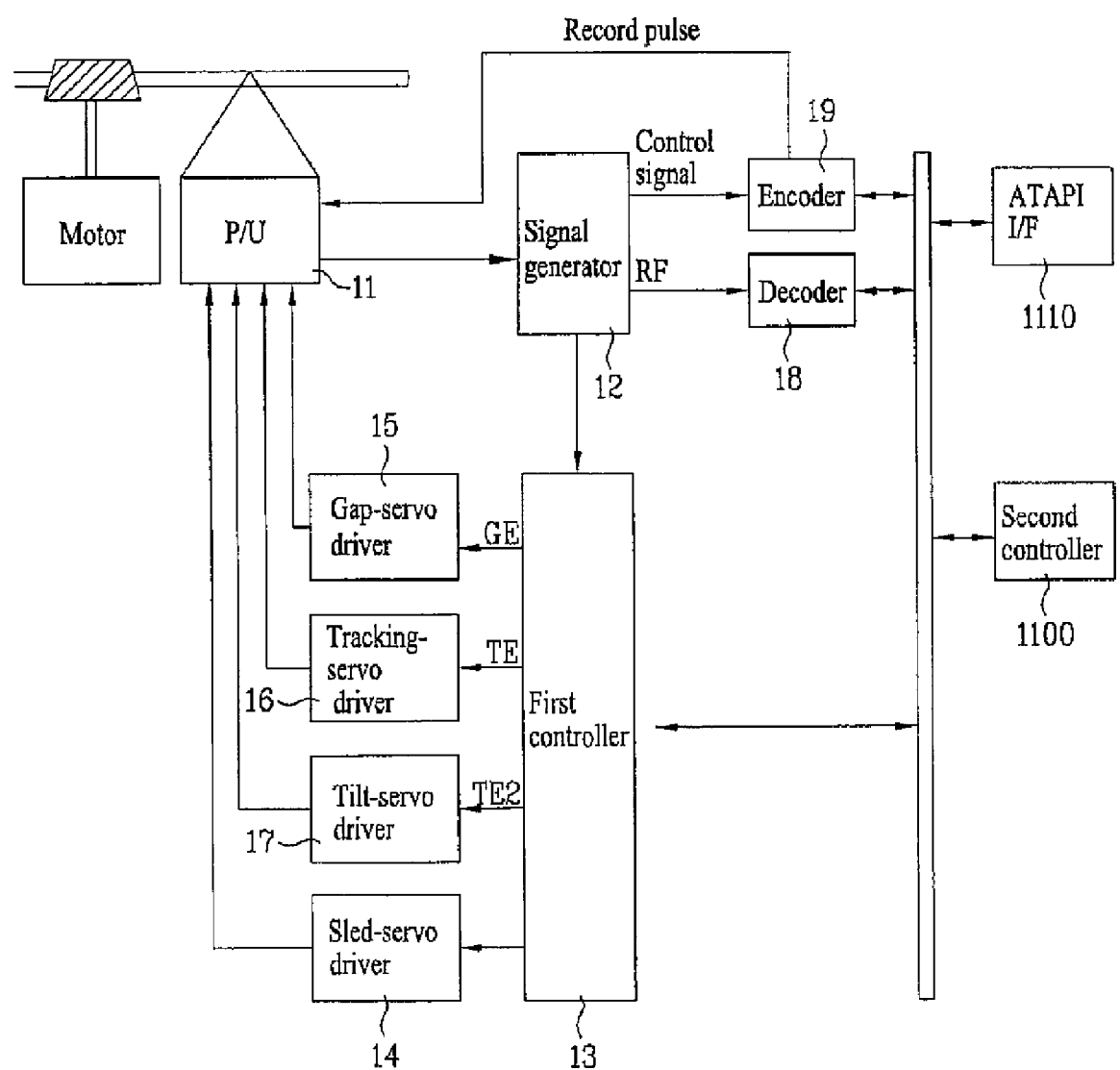
FIG. 6 is a block diagram illustrating a recording/reproducing apparatus according to one embodiment of the present invention.

FIG. 6 is a block diagram illustrating a recording/reproducing apparatus according to one embodiment of the present invention. FIG. 6 shows an optical pickup device (P/U) 11. The optical pickup device of FIG. 6 is the same as that of FIG. 5. A signal generator 12 receives an output signal of the optical pickup device 11, such that it generates the RF signal for reproducing data, the GE signal for controlling the servo, and a tracking-error (TE) signal using the received signal, as previously stated above.

A first controller 13 receives an output signal of the light receiving unit or an output signal of the signal generator 12, such that it generates a control signal or a drive signal. For example, the first controller 13 performs signal processing on the GE signal, such that it outputs a drive signal for controlling the interval between the lens unit 140 and the recording medium 150 to a gap servo driver 15. For another example, the first controller 13 performs signal processing on the track-error (TE) signal, such that it outputs a drive signal for controlling the tracking to the tracking servo driver 16. For yet another example, the first controller 13 performs signal processing on the tilt-error (TE2) signal, such that it outputs a drive signal for controlling the tilt to the tilt-servo driver 17.

The sled-servo driver 14 drives the sled motor (not shown) to move the optical pickup device 11, such that the optical pickup device 11 moves in the radial direction according to a moving command on a track.

The gap-servo driver 15 drives an actuator (not shown) contained in the optical pickup device 11, such that the optical pickup device 11 or the lens unit 140 moves in an optical-axis direction. As a result, the interval between the lens unit 140 and the recording medium 150 can be regularly maintained.

The tracking-servo driver 16 drives the actuator (not shown) contained in the optical pickup device 11, such that the optical pickup device 11 or the lens unit 140 moves in the radial direction, resulting in the correction of an erroneous light beam position. As a result, the optical pickup device 11 or its lens unit 140 may follow a predetermined track contained in the recording medium 150. The tracking-servo driver 16 may move the optical pickup device 11 or its lens unit 140 in the radial direction according to the track moving command.

The tilt-servo driver 17 drives the actuator (not shown) contained in the optical pickup device 11, such that the tilt of either the optical pickup device 11 or the lens unit 140 is changed. As a result, the horizontal status between the lens unit 140 and the recording medium 150 us maintained.

A host such as a personal computer (PC) can be connected to the above-mentioned recording/reproducing apparatus. The host transmits a recording/reproducing command to the second controller 100 via an interface, receives playback or reproduction data from a decoder 18, and transmits data to be recorded to an encoder 19. The second controller 100 controls the decoder 18, the encoder 19, and the first controller 13 upon receiving the recording/reproducing command from the host.

Generally, the above interface may be implemented with an Advanced Technology Attached Packet Interface (ATAPI) 110. In this case, the ATAPI 110 is an interface standard between the recording/reproducing apparatus and the host, and has been proposed to transmit data decoded by the recording/reproducing apparatus to the host. The ATAPI 110 converts the decoded data into a packet-format protocol capable of being processed by the host, and transmits the packet-format protocol.

The recording/reproducing method according to the present invention will hereinafter be described with reference to FIGS. 7 and 8.

Figure 7:
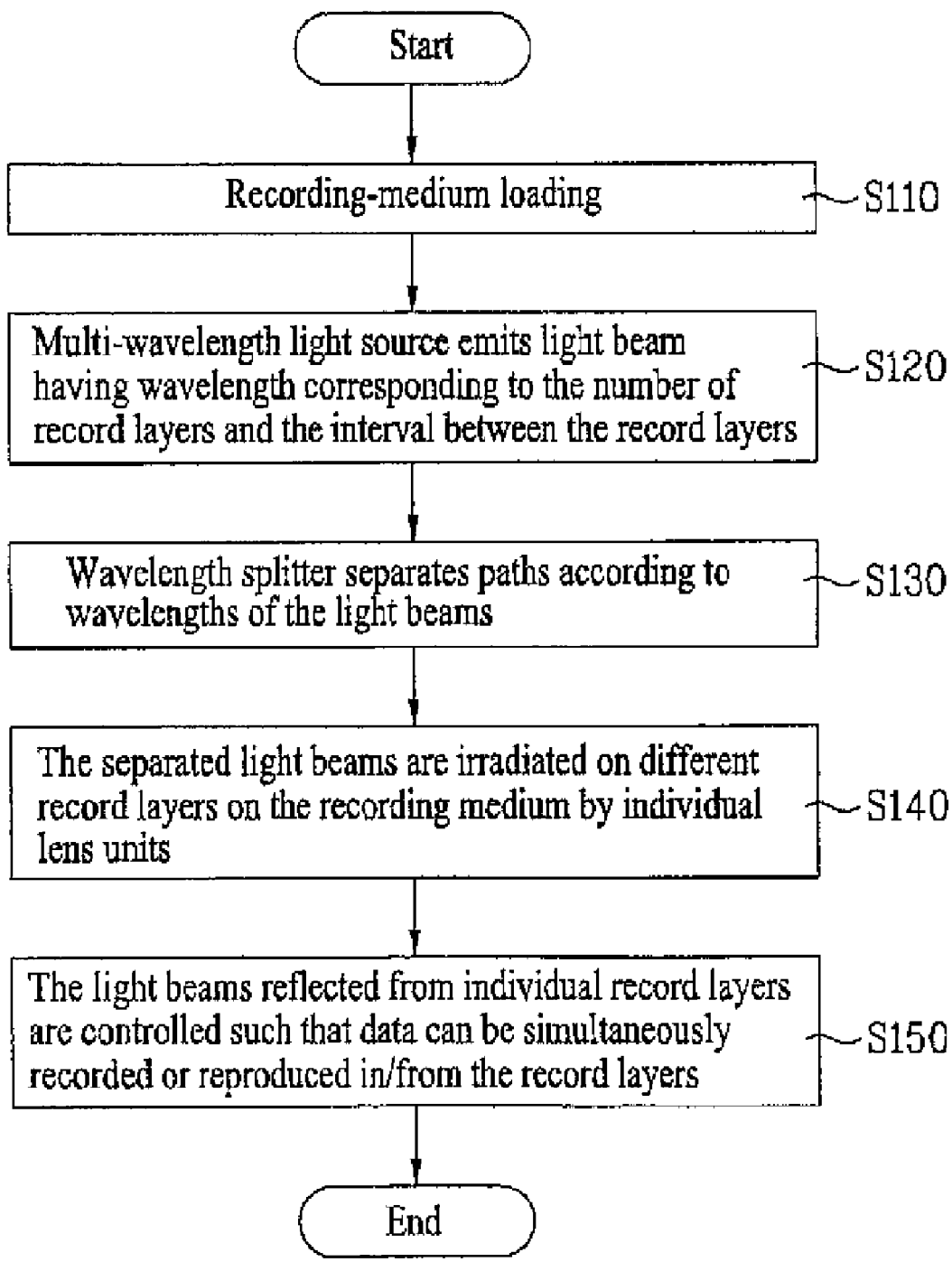
FIG. 7 is a flow chart illustrating a recording/reproducing method according to one embodiment of the present invention.

FIG. 7 is a flow chart illustrating a recording/reproducing method according to one embodiment of the present invention. For the convenience of description and better understanding of the present invention, the same reference numerals will be used throughout the drawings to refer to the same or like parts. If a recording medium is seated or loaded in the recording/reproducing apparatus at step S110, the operation of a data record command or a data playback command (or a data reproduction command) caused by the host begins or unique operations of other drivers begin, the optical pickup device 11 emits the light beam.

In this case, the light source 110 is a multi-wavelength light source including a plurality of light beams of different wavelengths, which correspond to the number of record layers contained in the recording medium 150 and intervals among the record layers. The multi-wavelength light beam is emitted from the light source 110 at step S120. The emitted multi-wavelength light beam is diffracted into different directions according to wavelengths of the light beams by the wavelength splitter 125, or the specified light beam may pass through the wavelength splitter 125 at step 130.

The light beams having separated wavelengths are irradiated on different record layers of the recording medium 150 by the lens unit 140 at step S140. The light beams reflected from individual record layers are separated and received, such that RF or control signals of individual record layers are additionally generated. Accordingly, light beams having diffraction wavelengths are irradiated on individual record layers, such that data can be simultaneously recorded in or reproduced from individual record layers.

If required, the recording/reproducing operations on each record layer may not be performed at the same time. For this purpose, the present invention may include a light beam of a specific wavelength in the light source or exclude the same light beam from the light source.

Figure 8:
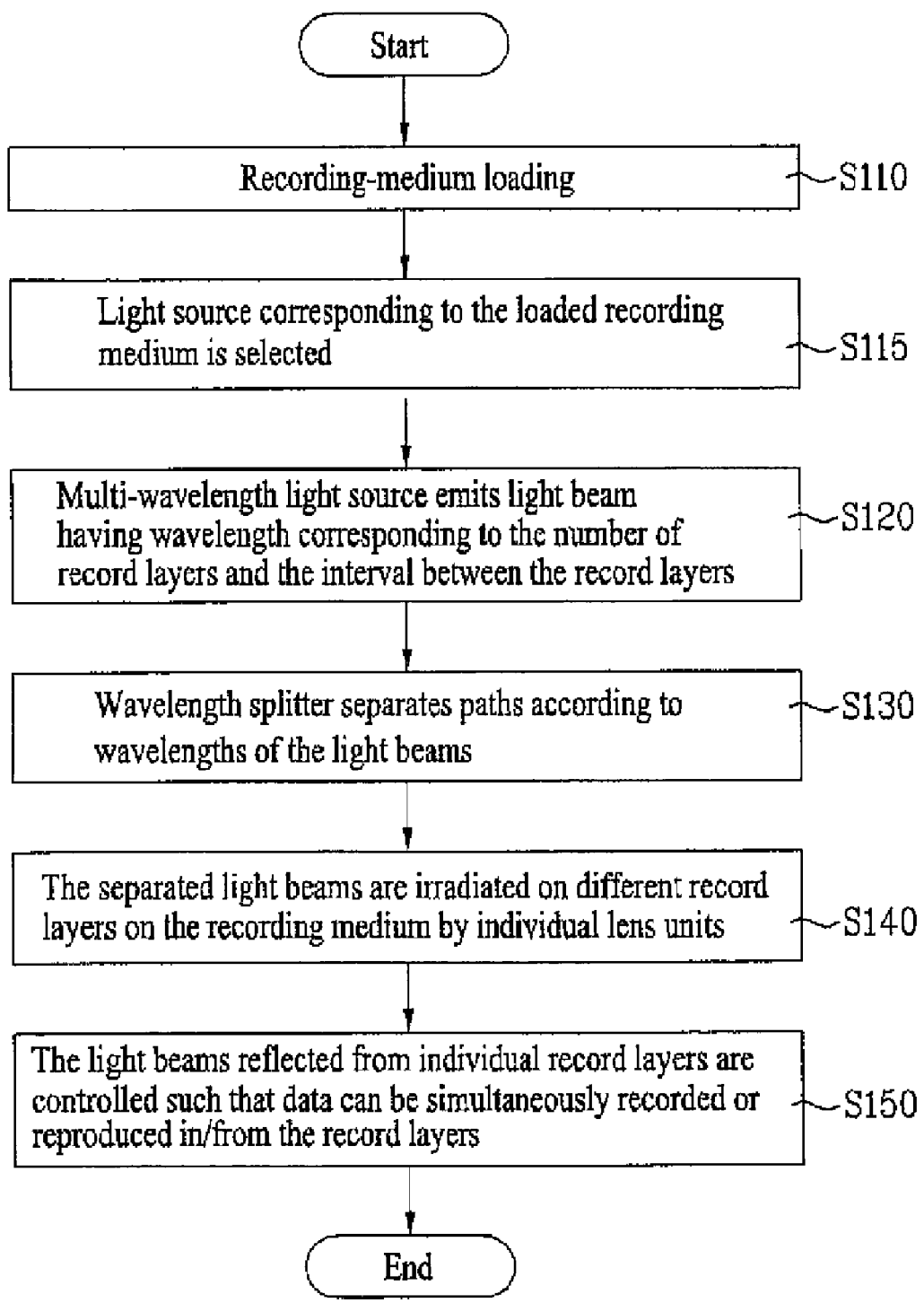
FIG. 8 is a flow chart illustrating a recording/reproducing method according to another embodiment of the present invention.

FIG. 8 is a flow chart illustrating a recording/reproducing method according to another embodiment of the present invention.

Referring to FIG. 8, if the recording medium 150 is seated or loaded in the recording/reproducing apparatus at step S110, the recording/reproducing method according to the present invention may further select the light source 110 corresponding to the loaded recording medium 150.

In other words, an interval between record layers of a blu-ray disc (BD) 150 is different from that of a near-field recording medium 150. Also, the number of light beams contained in the light source 110 must be changed according to the number of record layers. Therefore, the light source 110 including a plurality of wavelengths is classified into a plurality of light sources according to the recording-medium types. If the recording medium 150 is loaded, the present invention allows the user or the drive to select the light source 110 corresponding to the loaded recording medium. Otherwise, the wavelength types may be selectively combined, such that the light source 110 may be combined and generated.

Figure 9:
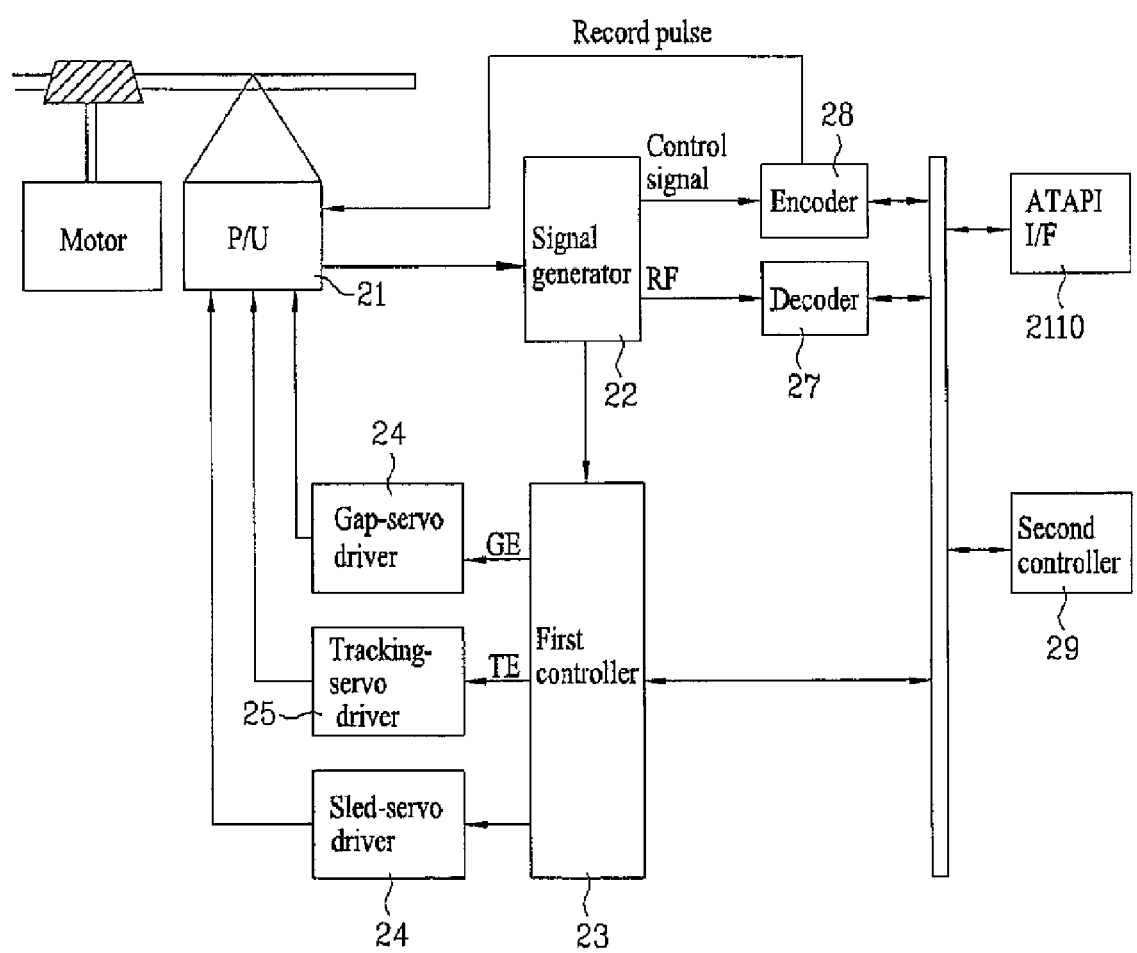
FIG. 9 is a block diagram illustrating a recording/reproducing apparatus according to another embodiment of the present invention.

FIG. 9 is a block diagram illustrating a recording/reproducing apparatus according to another embodiment of the present invention. Referring to FIG. 9, the optical pickup device (P/U) 21 irradiates the light beam on the recording medium, receives the light beam reflected from the recording medium, and generates an electric signal corresponding to the reflected light beam. The configuration of the optical pickup device 21 will hereinafter be described in detail.

Referring to FIG. 9, a signal generator 22 receives an electric signal from the optical pickup device 21, such that it generates a recording/reproducing signal (RF) required for reproducing data, the GE signal for controlling the servo, and a tracking-error (TE) signal using the received signal, as previously stated above.

A first controller 23 receives an output signal of the signal generator 22, such that it generates a control signal or a drive signal. For example, the first controller 23 performs signal processing on the GE signal, such that it outputs a drive signal for controlling the interval between the lens unit 240 and the recording medium to a gap servo driver 24. For another example, the first controller 23 performs signal processing on the track-error (TE) signal, such that it outputs a drive signal for controlling the tracking to the tracking servo driver 25. For yet another example, the first controller 23 performs signal processing on the tilt-error (TE2) signal, such that it outputs a drive signal for changing a focusing position on the recording medium to the gap-servo driver 24 or a focus driver (not shown).

The gap-servo driver 24 drives an actuator (not shown) contained in the optical pickup device 21, such that the optical pickup device 21 or the lens unit moves in an optical-axis direction. As a result, the interval between the lens unit 240 and the recording medium can be regularly maintained. If the gap-servo driver 24 has no additional focus driver, it drives the actuator contained in the optical pickup device 21, such that the focus adjusting unit 235 moves in the optical-axis direction. In this case, if the gap-servo driver 24 has an additional focus driver, this additional focus driver moves the focus adjusting unit 235 in the optical-axis direction according to a drive signal of the controller 23.

The tracking-servo driver 25 drives the actuator (not shown) contained in the optical pickup device 21, such that the optical pickup device 21 or the lens unit 240 moves in the radial direction, resulting in the correction of an erroneous light beam position. As a result, the optical pickup device 21 or its lens unit 240 may follow a predetermined track contained in the recording medium. The tracking-servo driver 25 may move the optical pickup device 21 or its lens unit 240 in the radial direction according to the track moving command.

The sled-servo driver 26 drives the sled motor (not shown) to move the optical pickup device 21, such that the optical pickup device 21 moves in the radial direction according to a moving command on a track.

A host such as a personal computer (PC) can be connected to the above-mentioned recording/reproducing apparatus. This recording/reproducing apparatus is called a drive. The host receives the recording/reproducing command from the second controller 29 via the interface. The second controller 29 controls the decoder 27, the encoder 28, and the controller 23 upon receiving the recording/reproducing command from the host. In this case, the above interface may be implemented with an Advanced Technology Attached Packet Interface (ATAPI) 2110. In this case, the ATAPI 2110 is an interface standard between the optical recording/reproducing apparatus such as a CD- or DVD-drive and the host, and has been proposed to transmit data decoded by the optical recording/reproducing apparatus to the host. The ATAPI 2110 converts the decoded data into a packet-format protocol capable of being processed by the host, and transmits the packet-format protocol. Therefore, the optical recording/reproducing apparatus receives playback data from the decoder 27, and transmits data to be recorded to the encoder 28, such that it records or reproduces data in/from the recording medium.

The optical system (not shown) contained in the optical pickup device 21 according to one embodiment of the present invention will hereinafter be described in detail.

Figure 10:
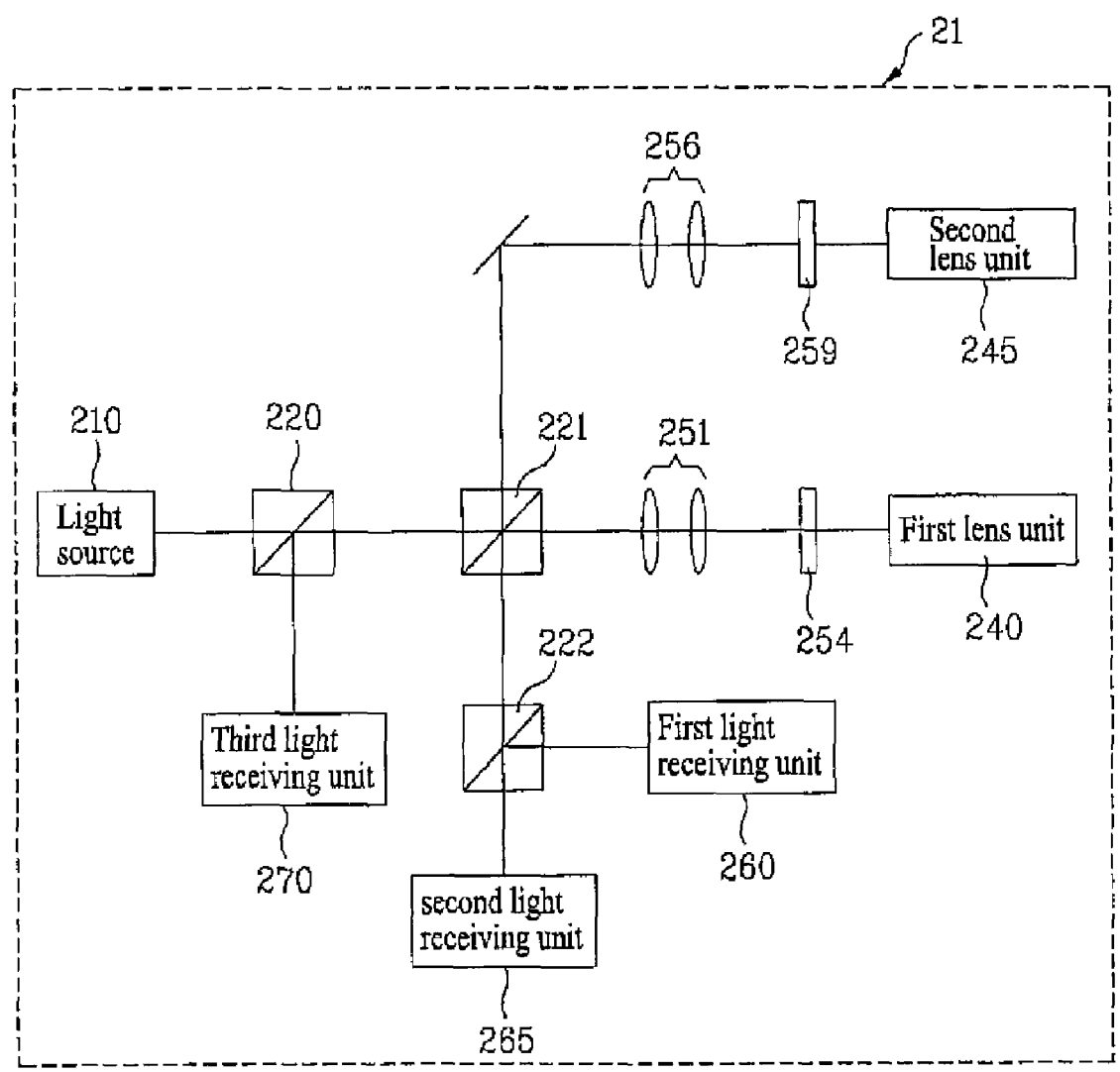
FIG. 10 is a block diagram illustrating an optical pickup device according to another embodiment of the present invention.

FIG. 10 is a block diagram illustrating an optical pickup device according to another embodiment of the present invention. Referring to FIG. 10, the optical system includes a light source 210, a first lens unit 240, a second lens unit 245, a plurality of beam splitters 220, 221, and 222 for adjusting the optical path, first to third light receiving units 260, 265, and 270 configured to receive the reflected light beam, focus adjusting units 251 and 256 for adjusting the light-focusing position on the recording medium, and polarizing converters 254 and 259 for converting the polarizing direction of the reflected light beam into another polarizing direction.

The light source 210 may be implemented with a laser beam having superior straightness. In more detail, the light source 210 may be implemented with a laser diode. The light beam, which emerges from the light source 210 and is irradiated on the recording medium, may be a parallel light beam. Therefore, the optical pickup device may include a lens (e.g., a collimating lens 215) which converts a light beam emerged from the light source 210 into a parallel light beam. That is, the collimating lens 215 may be arranged on the path of a light beam emerged from a point light, such that the path of the light beam is changed, resulting in the occurrence of a parallel light beam.

In this case, the light source 210 emits two light beams polarized into two directions. For this purpose, the exit surface of the light source 210 is coated with a wavelength plate, or the slit is attached to the exit surface. Although the present invention may use a plurality of light beams having different polarization directions, it may exemplarily use only two polarizations for the convenience of description. In this case, two light beams polarized into different directions may use two polarizations which are perpendicular to each other, such that they can be easily separated from each other. For the convenience of description, according to this embodiment of the present invention, a first-polarization light beam having horizontal vibrations is called an x-axis polarization, and a second-polarization light beam having vertical vibration is called a y-axis polarization. Detailed descriptions thereof will hereinafter be described in detail.

The beam splitter 220, 221, or 222 may separate light beams incident from the same direction from each other, or may synthesize other light beams incident from different directions. In this embodiment of the present invention, a first beam splitter 220, a second beam splitter 221, and a third beam splitter 222 exist, and detailed descriptions thereof will hereinafter be described in detail.

In this embodiment, the first beam splitter 220 passes only some parts of the incident light beam and reflects the remaining parts, and may be implemented with a non-polarized beam splitter (NBS) as an example. The second beam splitter 221 or the third beam splitter 222 passes only specific-directional polarization according to the polarization direction. In this embodiment, the second beam splitter 221 or the third beam splitter 222 may be implemented with a polarized beam splitter (PBS) as an example. For example, in the case of using the straight polarization, the polarized beam splitter (PBS) 221 passes only the polarization component (hereinafter referred to as "x-axis polarization") having horizontal vibrations and reflects the other polarization component (hereinafter referred to as "y-axis polarization") having vertical vibrations. Otherwise, the polarized beam splitter (PBS) 221 passes only the polarization component (hereinafter referred to as "y-axis polarization") having vertical vibrations and reflects the other polarization component (hereinafter referred to as "x-axis polarization") having horizontal vibrations.

In this embodiment, there are two lens units. The lens units irradiate the light beam emitted from the light source 210 on the recording medium, and condense the light beam reflected from the recording medium 150. In this case, the two lens units irradiate the light beam at different positions on the recording medium, such that data can be simultaneously recorded at different positions on the recording medium. In this embodiment, two lens units, each of which is based on a near-field (Near field), are used as the lens units, such that data can be simultaneously recorded or reproduced in/from the recording medium by the two lens units. In this case, one of the two lens units is called a first lens unit 240 and the other one is called a second lens unit 245. The first lens unit 240 and the second lens unit 245 are used as the near-field lens units, such that the near-field lens unit can be modified in various ways. For the convenience of description, the first lens unit 240 may have the same structure as that of the second lens unit 245, such that a detailed example of the first lens unit 240 will hereinafter be described.

Figure 11:
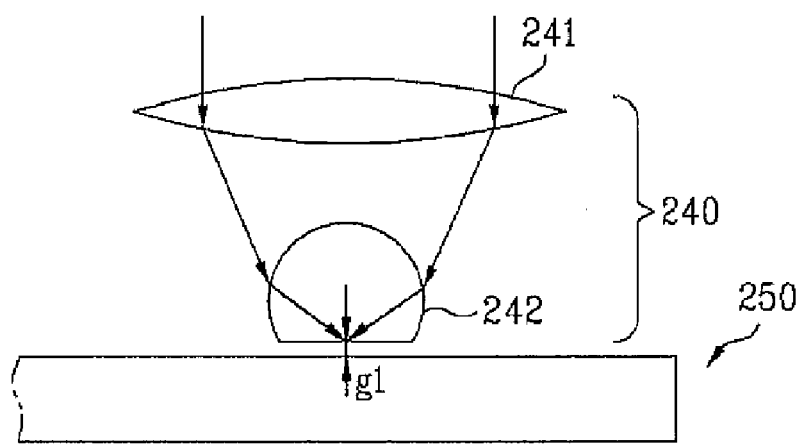
FIG. 11 is a cross-sectional view illustrating a lens unit of FIG. 10 and a recording medium according to the present invention.

The first lens unit 240 includes a high-refraction lens as well as the objective lens 241, increases a numerical aperture (NA), and forms Evanescent waves, such that it forms the near field. FIG. 11 is a cross-sectional view illustrating the lens unit of FIG. 10 and the recording medium according to the present invention. As shown in FIG. 11, the first lens unit 240 includes the objective lens 241 and the high-refraction lens 242. The high-refraction lens 242 is arranged on the optical path from the objective lens 241 to the recording medium 250. In this present invention, the objective lens 241 and the high-refraction lens 242 contained in the first lens unit 240 can be modified in various ways, and detailed descriptions thereof will hereinafter be described with reference to the annexed drawings. The above-mentioned high-refraction lens 242 is hereinafter referred to as a "near-field lens".

Figure 12:
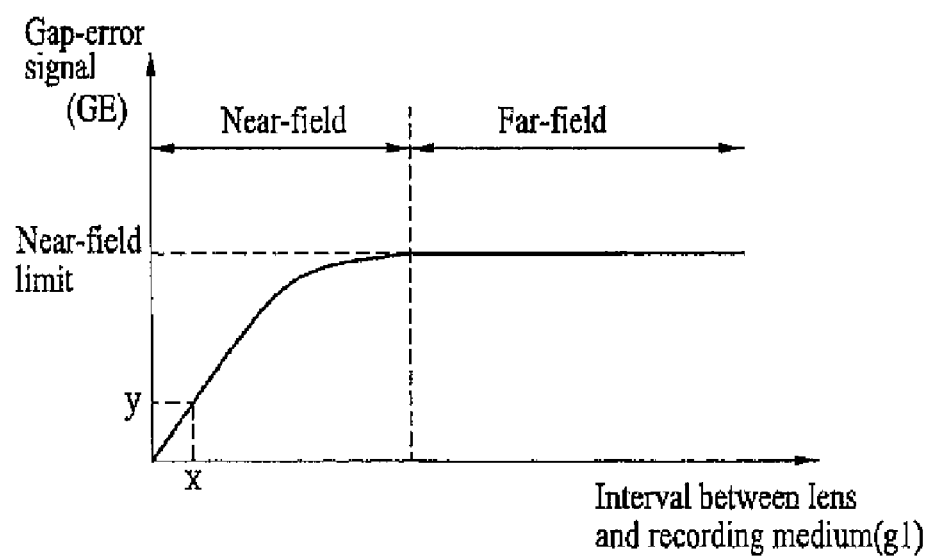
FIG. 12 is a graph illustrating a gap-error (GE) signal variation depending on the interval between a lens unit and a recording medium according to the present invention.

In a recording/reproducing apparatus based on the near field, an optical system of the optical pickup device 21 including the first and second lens units 240 and 245 must be very close to the recording medium 250. As shown in FIG. 12, the interval (denoted by "g1") between the near field lens 242 and the recording medium 250 must be equal to or less than an interval denoted by nanometers. In more detail, the relationship between the first lens unit 240 and the recording medium 250 will hereinafter be exemplarily described in detail.

If the interval between the first lens unit 240 and the recording medium 250 is equal to or less than about ¼ (i.e., λ/4) of an optical wavelength, some parts of the light beam, which has been received in the first lens unit 240 at a threshold angle or more, are not fully reflected from the surface of the recording medium 250, and form Evanescent waves. The Evanescent waves pass through the recording medium 250, and arrive at record layers. These Evanescent waves arrived at the record layers may be used to record or reproduce data. As a result, by the light beam under the diffraction limit, high-density bit information can be stored in the recording medium. However, if the interval between the first lens unit 240 and the recording medium 250 is longer than λ/4, the optical wavelength loses unique characteristics of Evanescent waves and returns to its original wavelength, and the light beam is fully reflected from the surface of either the recording medium 250 or the near field lens 242. In this case, the Evanescent waves cannot be formed, such that the recording/reproducing operation caused by the near field cannot be performed. Generally, in a near-field recording/reproducing apparatus, the interval between the first lens unit 240 and the recording medium 250 is controlled to be less than about λ/4. In this case, it should be noted that the value of λ/4 is used as a near-field limit. That is, in order to use the near field, the interval between the first lens unit 240 and the recording medium 250 must be equal to or less than an interval denoted by nanometers. This requirement can also be equally applied to the second lens unit 245.

In order to maintain the aforementioned nanometer-level interval, the present invention may use a gap-error (GE) signal. Detailed description thereof will hereinafter be described with reference to FIGS. 12 to 17.

As described above, the interval between the near-field lens 242 and the recording medium 250 must be maintained at a nanometer-level interval, and the interval between the objective lens 241 and the near-field lens 242 may escape from a micrometer-level interval. If a user moves the objective lens 242 from the micrometer-level interval to another position to change a light-focusing position on the recording medium 250 to another position, sub-ranges ¹⁄₁₀~¹⁄₁₀₀ of the above-mentioned interval must also be controlled. As a result, in fact, moving the objective lens 242 to change the focusing position, simultaneously while maintaining the relationship between the objective lens 241 and the near-field lens 242 is very difficult to be implemented. Therefore, the present invention may further include a focus adjusting unit capable of changing the focusing position under the condition the objective lens 241 and the near-field lens 242 have been fixed at specific positions.

Figure 13:
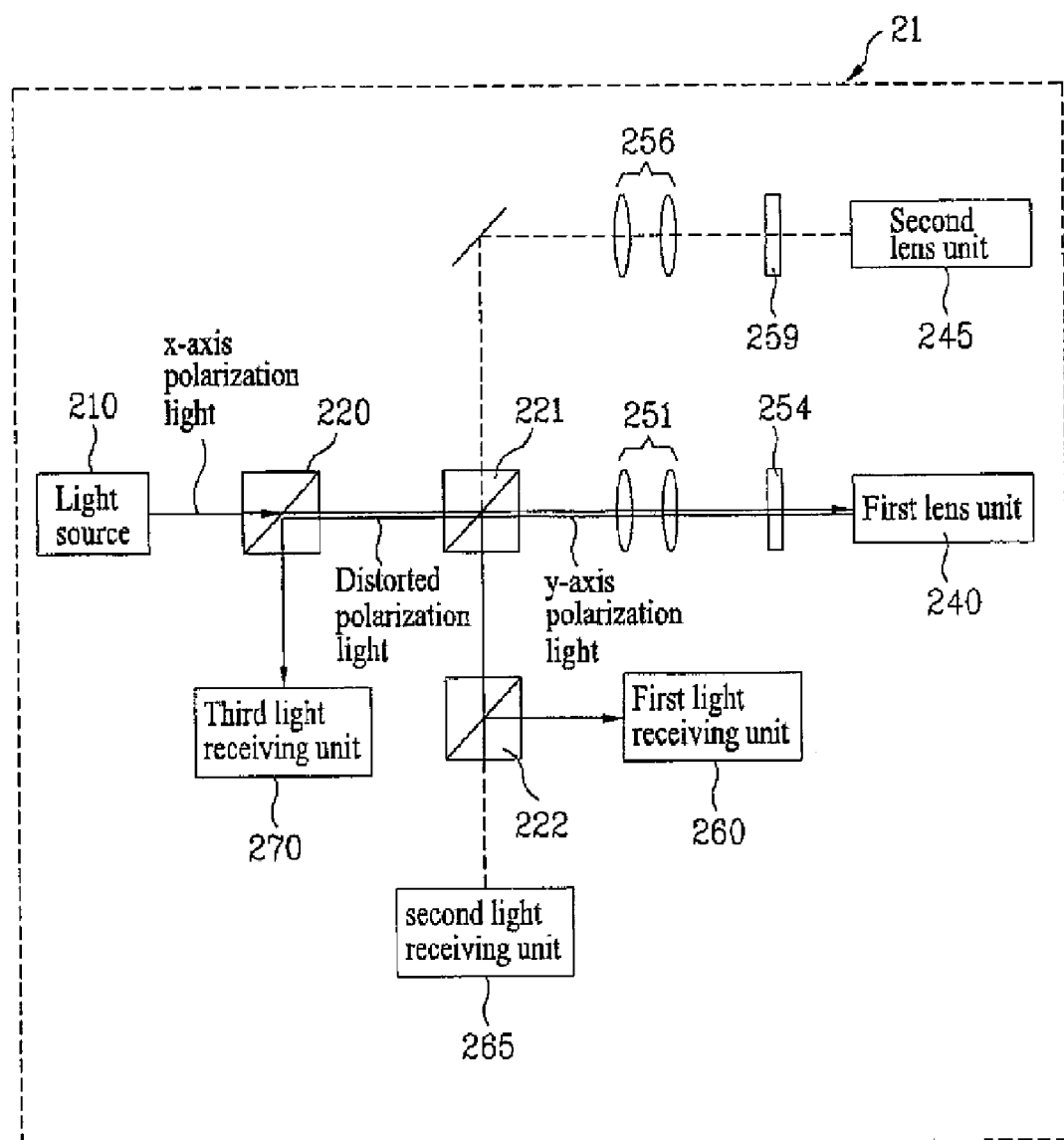
FIGS. 13 and 14 are block diagrams illustrating the flow of optical signals of FIG. 10 according to the present invention.
Figure 15:
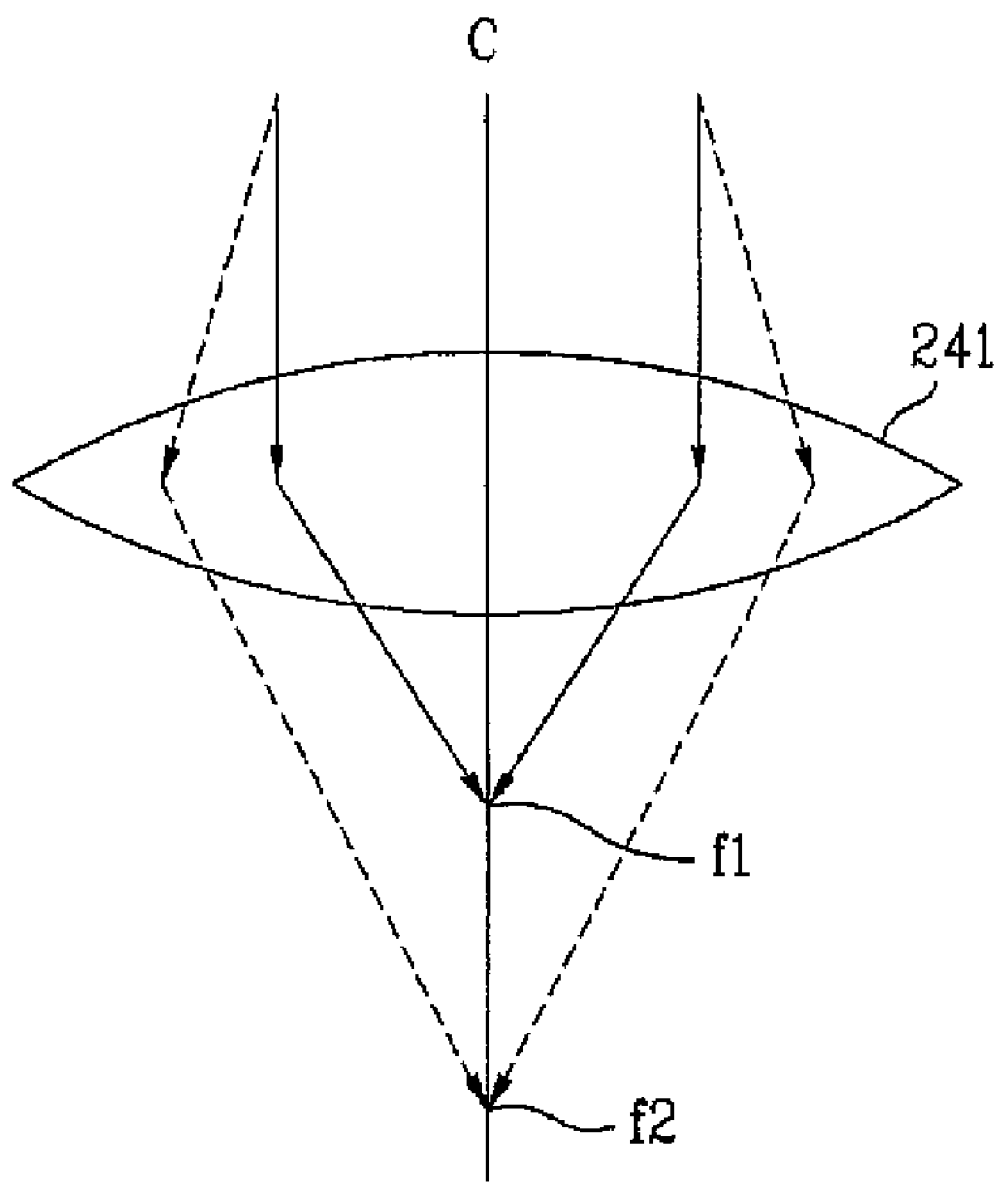
FIG. 15 is a conceptual diagram illustrating an optical-path variation caused by a focus adjusting unit according to the present invention.

In one embodiment of the present invention, the optical pickup device of FIG. 10 includes a first focus adjusting unit 251 for adjusting a first light beam incident to the first lens unit 240 and a second focus adjusting unit 256 for adjusting a second light beam incident to the second lens unit 245. In this case, the first focus adjusting unit 251 and the second focus adjusting unit 256 may be used to change the position of the light beam focused on the multi-layered recording medium 250 including one or more record layers. For example, the first focus adjusting unit 251 changes an incident angle of the light beam incident to the objective lens 241 to another incident angle, resulting in the change of a focal length. In FIG. 15, a solid line indicates the path of a light beam, which is incident to the objective lens 241 in parallel. This parallel light beam incident to the objective lens 241 has a focal length by which the parallel light beam is focused at the position of f1. In the meantime, the dotted line of FIG. 13 illustrates that the incident angle of the light beam incident to the objective lens 241 is changed to another angle. If the light beam passing through the first focus adjusting unit 251 diverges and enters the objective lens 241 via the path such as the dotted line, the light beam refracted at the objective lens 241 has a predetermined focal length by which the light beam is focused at the position of f2. In other words, the path of the light beam incident to the objective lens 241 is changed to another path, such that the light beam may be focused at different positions on the recording medium 250. As a result, although the objective lens 241 is fixed at a specific position, the position focused on the recording medium 250 may be changed to another position. Therefore, the direction of the incident light beam must be maintained without any change, or must diverge or converge, in such a way that the direction of the incident light beam needs to be adjusted. In this embodiment, the first focus adjusting unit 251 is used to adjust the direction of the incident light beam.

Figure 16:
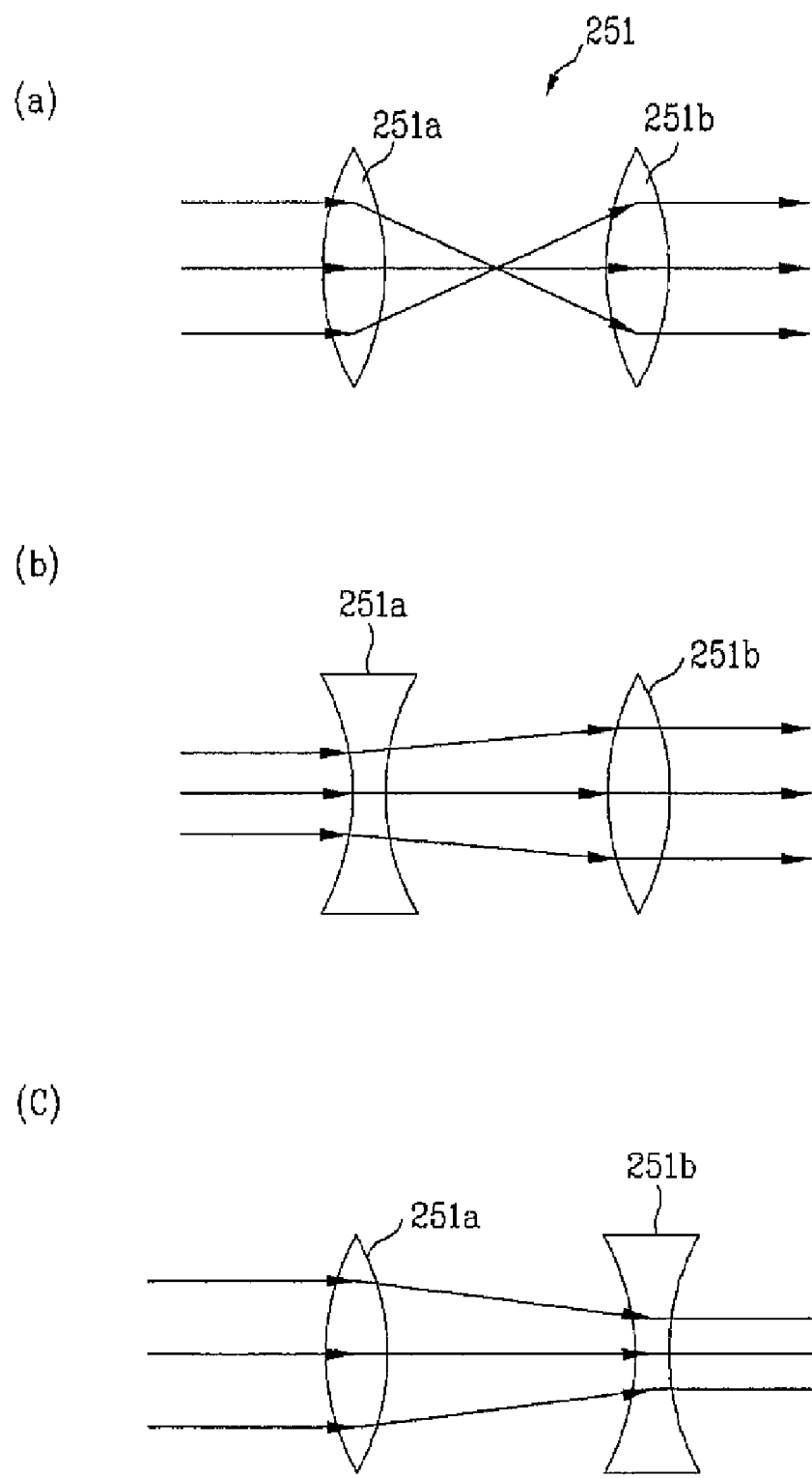
FIGS. 16A~16C show exemplary focus adjusting units according to the present invention.

A detailed example of the first focus adjusting unit 251 is shown in FIG. 16. FIGS. 16A~16C show exemplary focus adjusting units according to the present invention. In FIGS. 16A~16C, the first focus adjusting unit 251 may be used to maintain the path of the incident light beam without any change, or may control the path of the incident light beam to diverge or converge. In this case, the first focus adjusting unit 251 must be designed to maintain the direction of the incident light beam without any change. A detailed example of the focus adjusting unit 251 is shown in FIG. 16. In this case, the first focus adjusting unit 251 may be used to maintain the path of the incident light beam without any change, or may control the path of the incident light beam to diverge or converge. The focus adjusting unit 251 may include a combination of at least one convex lens and at least one concave lens.

FIG. 16A shows an exemplary focus adjusting unit including two convex lenses. FIG. 16B shows an exemplary focus adjusting unit including a single concave lens and a single convex lens. FIG. 16C shows an exemplary focus adjusting unit including a single convex lens and a single concave lens. In the above-mentioned focus adjusting units of FIGS. 16A~16C, the parallel light beam can be maintained without any change. In this case, the focus adjusting unit of FIG. 16 increases a diameter of the incident light beam, and the other focus adjusting unit of FIG. 16C reduces the diameter of the incident light beam. For the convenience of description and better understanding of the present invention, the focus adjusting unit of FIG. 16A will hereinafter be described as an example of the present invention.

Figure 17:
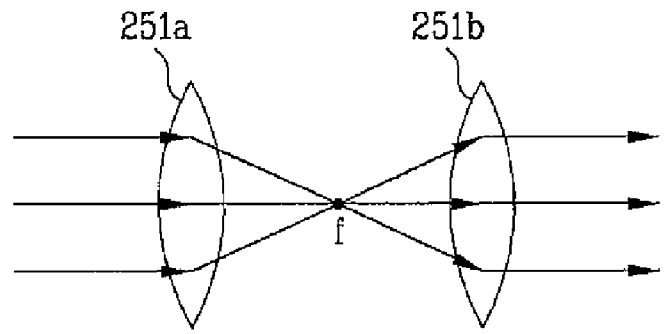
FIGS. 17A~17C show exemplary changes of a focusing position caused by the focus adjusting unit according to the present invention.
Figure 17:
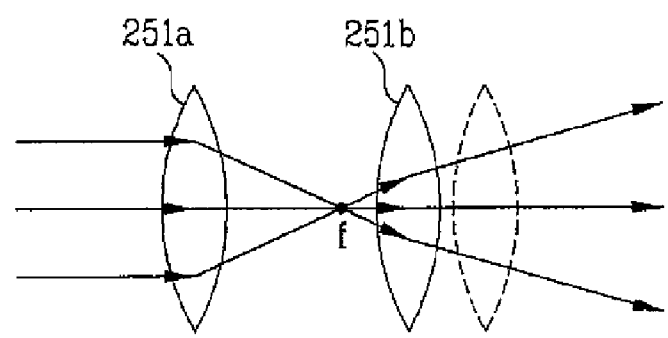
Figure 17:
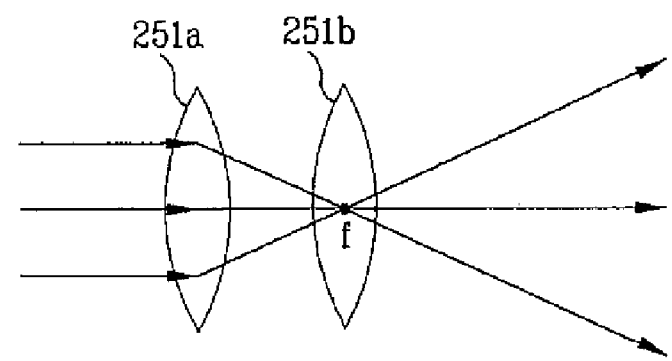

FIG. 17 shows the change of the path adjusted by the focus adjusting unit 251 of FIG. 16A. FIG. 17A shows that first and second focus lenses 251a and 251b of the focus adjusting unit 251 have the same focal point. In FIG. 17A, the parallel light beam incident to the first focus lens 251a enters the second focus lens 251b via the focal point, and the other light beam emitted from the second focus lens 251b becomes a parallel light beam. That is, the direction of the incident light beam can be maintained without any change. In this case, if the optical pickup device includes the focus adjusting unit 251 of FIG. 16B or FIG. 16C, the diameter of the parallel light beam is changed as shown in FIG. 16B or 16C.

FIGS. 17B~17C show that different focal points are made according to movement of the second focus lens 251b. As shown in FIGS. 17B~17C, the parallel light beam incident to the first focus lens 251a forms a light beam diverging from the second focus lens 251b. In this way, according to this embodiment, any one of lenses is movably arranged to form a divergent or convergent light beam. In more detail, in this embodiment, the second focus lens 251b is movably arranged. Therefore, the direction of the light beam incident to the lens unit 240 is changed to another direction, such that the position focused on the recording medium 250 may be changed to another position. In other words, according to this embodiment, the light beam may be focused on different record layers of the recording medium 250 including multiple record layers, irrespective of the movement of the objective lens 241. The above-mentioned configuration may also be equally applied to the second focus adjusting unit 256 without departing from the spirit or scope of the invention.

Figure 18:
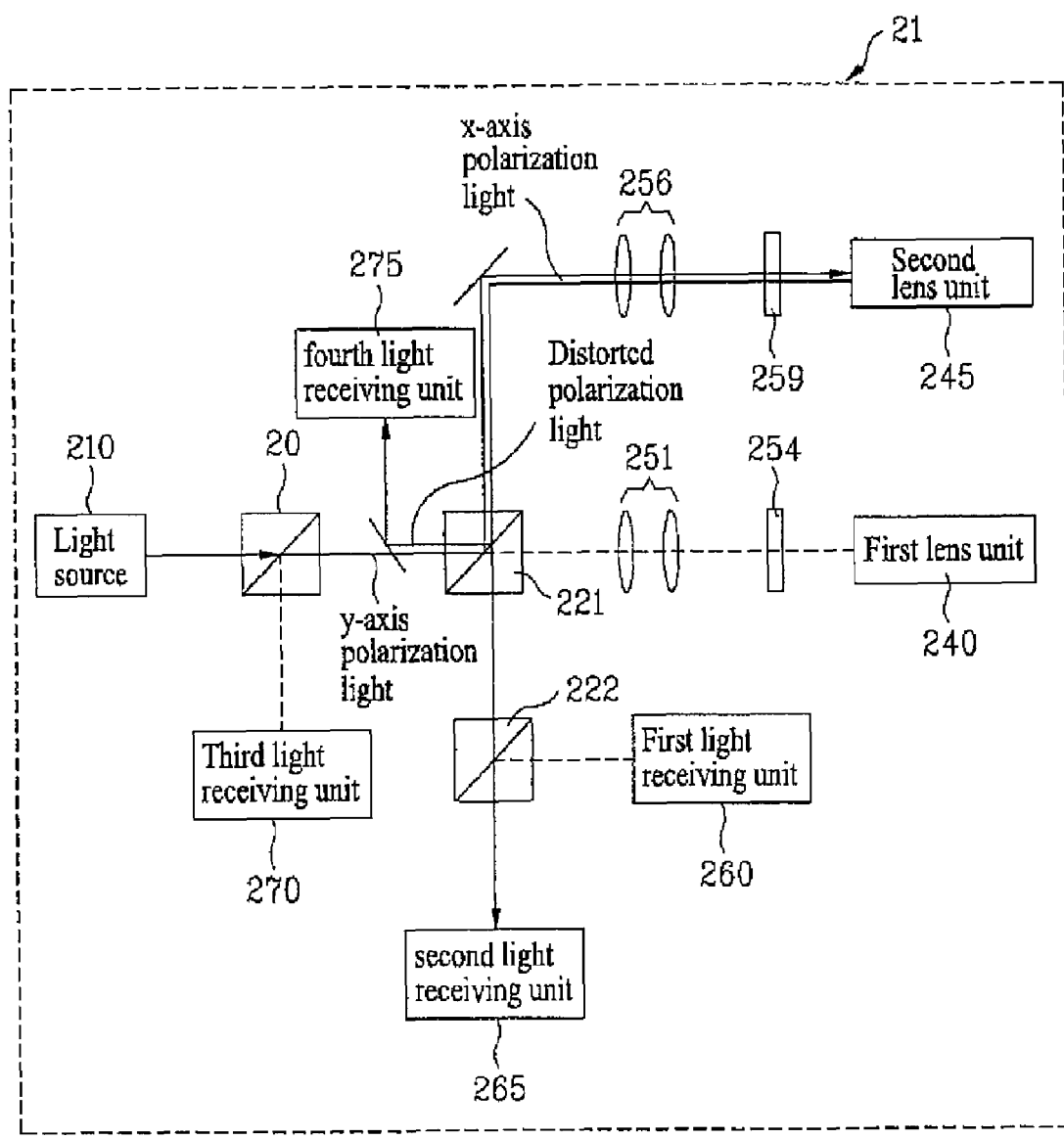
FIG. 18 is a block diagram illustrating an optical pickup device for use in a recording/reproducing apparatus according to another embodiment of the present invention.

FIG. 18 is a block diagram illustrating an optical pickup device for use in a recording/reproducing apparatus according to another embodiment of the present invention. Referring to FIG. 18, the optical system according to one embodiment of the present invention further includes polarization converters 254 and 259, which convert the polarization direction of the light beam reflected from the recording medium 250 into another direction. In this case, if a polarization direction occurs when the incident light beam is reflected, the polarization converter 254 or 259 converts the polarization direction into another polarization direction, such that the path of the reflected light beam is changed. The polarization converter 254 or 259 may be implemented with a quarter wave plate (QWP). This QWP is an optical element for rotating the polarization direction of the reflected light beam by 90 degrees, performs left-hand circular polarization (LHCP) of the light beam incident to the recording medium 250, and performs right-hand circular polarization (RHCP) of the reflected light beam traveling in an inverse direction. As a result, the polarization direction of the reflected light beam received from the QWP is changed in another direction different from that of the incident light beam, and the above two polarization directions are 90 degrees out of phase with each other. The above-mentioned optical system includes the non-polarized beam splitter (NBS) 254 for diverting the polarization direction of the light beam reflected from the first lens unit 240, and a polarized beam splitter (PBS) 259 for diverting the polarization direction of the light beam reflected from the second lens unit 245. In the case of using the QWP, the incident light beam is left-hand circularly polarized, and the reflected light beam is right-hand circularly polarized. As a result, the resultant reflected light beam has the polarization direction perpendicular to that of the light beam incident to the QWP.

Also, the optical system further includes the light receiving units 260, 265, and 270, which are capable of receiving the light beam reflected from the recording medium 250 via the first lens unit 240 or the second lens unit 245. In this case, the light receiving units 260, 265, and 270 receive the reflected light beam, perform photoelectric conversion on the received light beam, and generate an electric signal corresponding to a quantity of light of the reflected light beam. In this embodiment, as shown in FIG. 10, the present invention exemplarily includes a first light receiving unit 260, a second light receiving unit 265, and a third light receiving unit 270 for the convenience of description and better understanding of the present invention.

In this case, the first light receiving unit 260 receives the reflected light beam, which is polarized in the direction perpendicular to the incident light beam reflected from the first lens unit 240. The second light receiving unit 265 receives the reflected light beam, which is polarized in the direction perpendicular to the incident light beam reflected from the second lens unit 245. The first light receiving unit 260 and the second light receiving unit 2650 may be implemented with two photo-diodes, each of which splits into a predetermined number of sections (e.g., 2-section) in either a signal track direction or a radial direction of the recording medium 250. Also, the first light receiving unit 260 and the second light receiving unit 2650 may be implemented with four photo-diodes, each of which splits into a predetermined number of sections (e.g., 4-section) in either the signal track direction or the radial direction of the recording medium 250.

The optical system further includes the lens driver (not shown) for driving the first lens unit 240 and the second lens unit 245. The lens driver is used to adjust the first lens unit 240 and the second lens unit 245. Specifically, the lens driver may precisely drive the first and second lens units 240 and 245 using an electric or magnetic field. For this precise control, the optical system may use the actuator employing wound coils. If the optical system includes a single light receiving unit to receive a distorted light beam as shown in the embodiment of FIG. 2 (i.e., the single light receiving unit is the third light receiving unit), the optical system includes a single lens driver, which is capable of simultaneously controlling the first and second lens units 240 and 245 according to the GE signal received from the third light receiving unit.

In the optical pickup device 21 of the recording/reproducing apparatus, the flow of signals of the optical system based on the path of the light beam emitted from the light source 210 will hereinafter be described in detail with reference to FIGS. 13 and 14.

Figure 14:
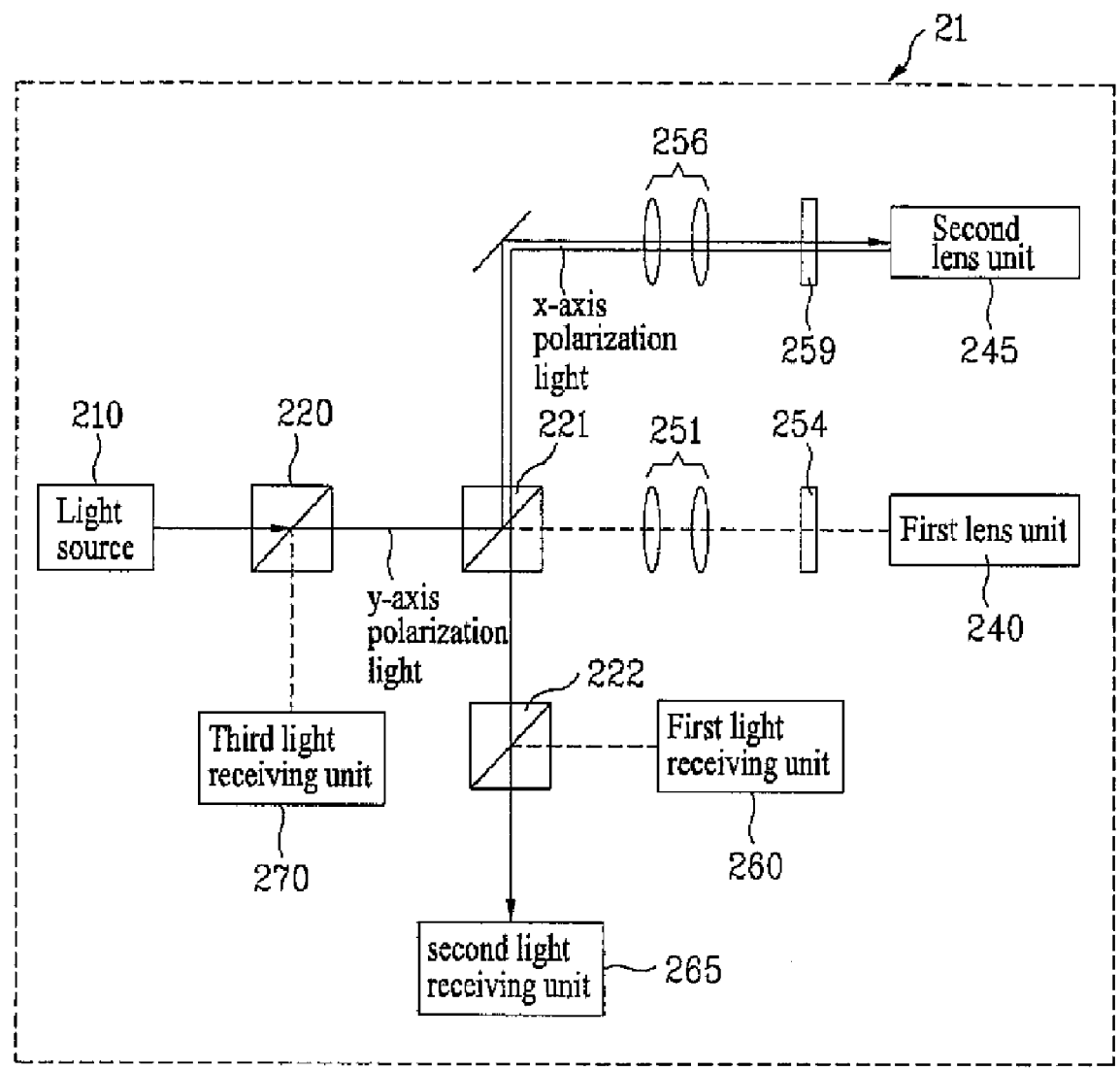

FIGS. 13 and 14 are block diagrams illustrating the flow of optical signals of FIG. 10 according to the present invention. FIG. 13 shows a path of the X-axis polarization emitted from the light source 210 of the optical system of FIG. 10. FIG. 14 shows a path of the Y-axis polarization emitted from the light source 210 of the optical system of FIG. 10.

The X-axis polarization emitted from the light source 210 is incident to the first beam splitter 220, such that some parts of the X-axis polarization are reflected, and other parts are incident to the second beam splitter 221. The second beam splitter 221 passes the X-axis polarization simultaneously while reflecting the Y-axis polarization. The X-axis polarization goes to the first lens unit 240 after passing through the second beam splitter 221. In this case, the position focused on the recording medium 250 may be adjusted by the first focus adjusting unit 251. The light beam, which has been irradiated on the recording medium 250 and reflected from the recording medium 250 by the first lens unit 240, is condensed by the first lens unit 240. The condensed reflected light beam is converted into the Y-axis polarization by the polarization converter 254 as previously stated above. The Y-axis polarization reflected light beam is reflected from the second beam splitter 221, such that the resultant light beam is incident to a third beam splitter 222. The third beam splitter 222 is designed to pass the X-axis polarization simultaneously while reflecting the Y-axis polarization. Therefore, the reflected light beam is reflected from the third beam splitter 222, such that the resultant light beam is received in the first light receiving unit 260. In this case, the first lens unit 240 includes a high-refraction lens to form a near field, such that the reflected light beam may include a light beam having unexpected polarization direction distorted by the first lens unit 240. The distorted light beam passes through the second beam splitter 221, such that it is incident to the first beam splitter 220. Some parts of the distorted light beam pass through the first beam splitter 220, and other parts are reflected from the first beam splitter 220, such that the resultant light beam is received in the third light receiving unit.

Figure 19:
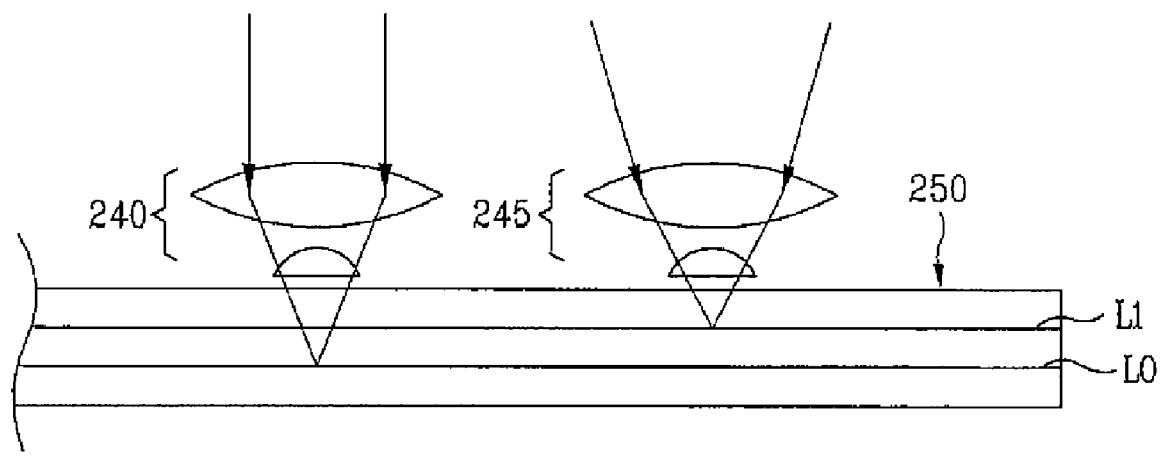
FIG. 19 is a conceptual diagram illustrating a method for simultaneously irradiating optical signals on different record layers using an optical system according to the present invention.

The Y-axis polarization emitted from the light source 210 is incident to the first beam splitter 220, such that some parts of the Y-axis polarization are reflected and other parts are incident to the second beam splitter 221. The Y-axis polarization is reflected from the second beam splitter 221, such that it goes to the second lens unit 245. In this case, the position focused on the recording medium 250 may be adjusted by the second focus adjusting unit 256. The second focus adjusting unit 256 may be arranged separately from the first focus adjusting unit 251, such that data can be simultaneously recorded or reproduced in/from two record layers as shown in FIG. 19. As a result, the present invention provides a structure capable of increasing a data processing rate of the recording medium 250 including multiple record layers (e.g., a first record layer L0 and a second record layer L1).

The light beam, which has been irradiated on the recording medium 250 and reflected from the recording medium 250, is re-condensed by the second lens unit 245. The condensed reflected light beam is converted into X-axis polarization by the polarization converter 259 as previously stated above. The X-axis polarization passes through the second beam splitter 221 and the third beam splitter 222. Therefore, the reflected light beam is received in the second light receiving unit 265.

In another embodiment of the present invention, the optical system further includes a fourth light receiving unit 275 as shown in FIG. 18. FIG. 18 is a block diagram illustrating an optical pickup device for use in a recording/reproducing apparatus according to another embodiment of the present invention. Referring to FIG. 18, the fourth light receiving unit 275 receives the distorted light beam having distorted polarization from the light beam reflected from the second lens unit 245. In this embodiment, if the first lens unit 240 and the second lens unit 245 receive the distorted light beam in different ways, there is needed a first lens driver (not shown) for the first lens unit 240, and there is needed a second lens driver (not shown) for the second lens unit 245.

A method for recording/reproducing data in/from the recording medium according to the present invention will hereinafter be described with reference to FIGS. 20 and 21.

Figure 20:
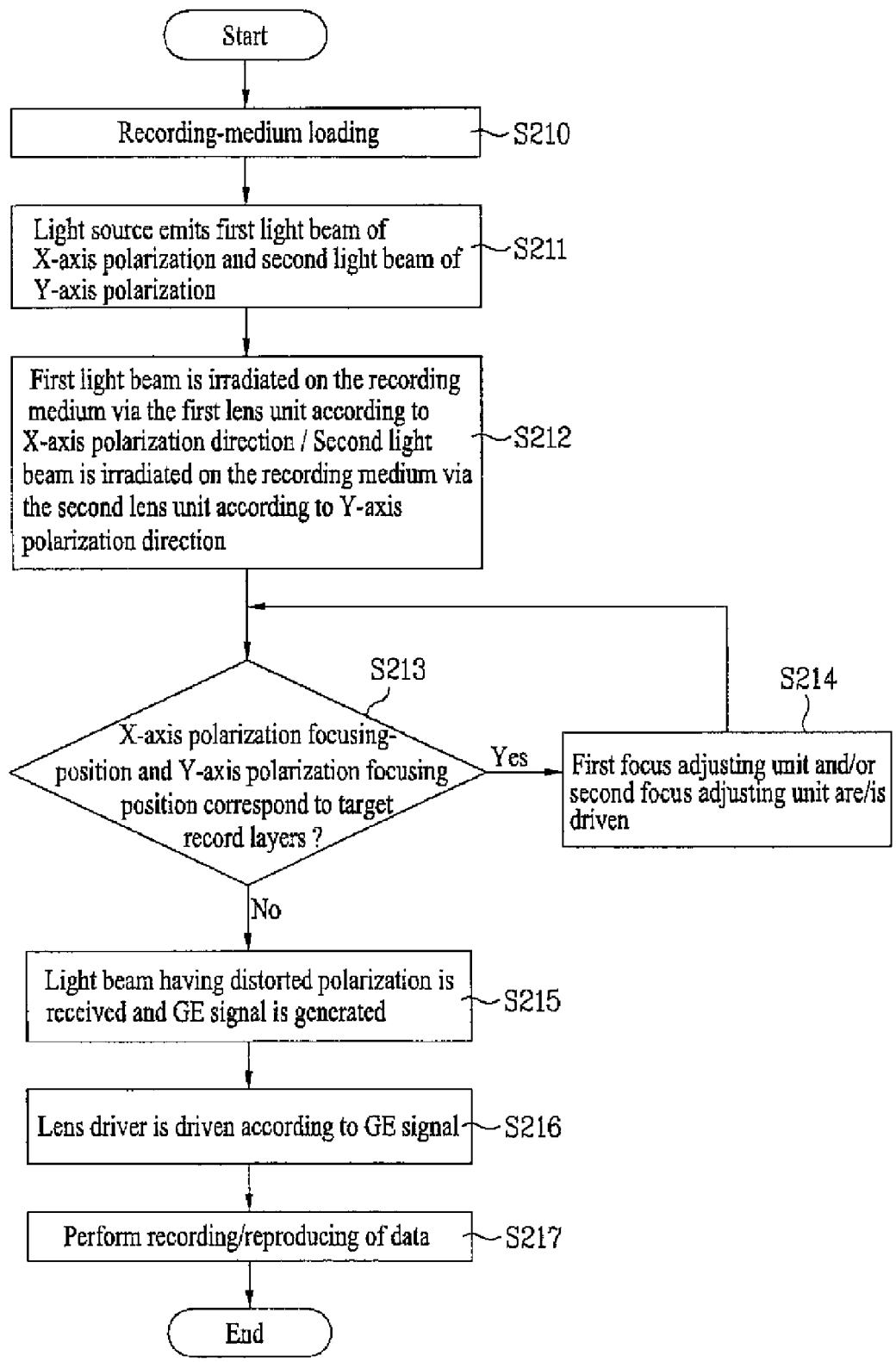
FIG. 20 is a flow chart illustrating a recording/reproducing method according to one embodiment of the present invention.

FIG. 20 is a flow chart illustrating a recording/reproducing method according to one embodiment of the present invention. FIG. 21 is a flow chart illustrating a control method of the recording/reproducing apparatus according to one embodiment of the present invention.

If the recording medium is loaded in the recording/reproducing apparatus, the light source 210 emits two light beams (i.e., X-axis polarization light beam and Y-axis polarization light beam) to perform the recording/reproducing operation at step S211. The X-axis polarization light beam and the Y-axis polarization light beam are separated from each other by the beam splitter, such that the X-axis polarization light beam is irradiated on the recording medium via the first lens unit and the Y-axis polarization light beam is irradiated on the recording medium via the second lens unit at step S212. In this case, the above-mentioned recording/reproducing method determines whether a focusing position of a light beam irradiated on the recording medium via the first lens unit and the other focusing position of the other light beam irradiated on the recording medium via the second lens unit are correspondent with record layers acting as objective record layers at step S213. If the individual focusing positions are not correspondent with the objective record layers, the first focus adjusting unit 251 or the second focus adjusting unit 256 is driven, such that the individual light beams are correctly focused on objective record layers at step S214. If the focusing positions of the above light beams are correct, the recording/reproducing apparatus receives a distorted-polarization light beam from among two reflected light beams, and generates the GE signal. The recording/reproducing apparatus drives the lens driver (not shown) corresponding to the GE signal, controls the interval among the first lens unit 240, the second lens unit 245, and the recording medium 250, such that it can record or reproduce data in/from the recording medium.

In this case, the lens driver may be continuously feedback-controlled by the gap-error (GE) signal during the recording or reproducing time of data. In this case, the generation of the gap-error (GE) signal and a control method using this gap-error (GE) signal will hereinafter be described in detail.

For the convenience of description, according to the embodiment of FIG. 10, the third light receiving unit 270 may be composed of two photo-diodes PDA and PDB as an example of the present invention. Two photo-diodes output electric signals "a" and "b" corresponding to a quantity of light, respectively. The signal generator 22 of FIG. 9 generates a gap-error signal (GE), a tracking-error signal (TE), or a recording/reproducing signal (RF) upon receiving the electric signal from the third light receiving unit 270. The recording/reproducing signal (RF) may be generated by the sum of output signals of the photo-diodes, and the tracking-error signal (TE) may be generated by a signal corresponding to a difference between the output signals of the photo-diodes.

Next, the gap-error signal (GE) will hereinafter be described in detail. The signal generator 22 may generate the gap-error (GE) signal for controlling the interval between the lens and the recording medium 250 using the output signals "a" and "b" of the third light receiving unit 270. The gap-error (GE) signal may be generated by the sum of output signals of the photo-diodes of the third light receiving unit 270. This gap-error (GE) signal can be represented by the following equation 1:

$$GE = a + b \qquad \text{[Equation 1]}$$

In this case, the gap-error (GE) signal is equal to the sum of all electric signals corresponding to the quantity of light, such that it is proportional to the quantity of reflected light received in the third light receiving unit 270.

As shown in FIG. 12, within the scope of a near field, the gap-error (GE) signal exponentially increases as the interval (g1) between the first lens unit 240 and the recording medium 250 gradually increases. In a far field out of the near field, the gap-error (GE) signal has a regular size or magnitude, and detailed description thereof will hereinafter be described in detail. If the interval (g1) between the lens unit 240 and the recording medium 250 escapes from the near field, namely, if the interval (g1) is longer than λ/4 indicative of the near-field limit (i.e., the boundary between the near field and the far field), the incident light beam of more than a threshold angle is fully reflected from the recording medium 250. Otherwise, if the interval (g1) between the lens unit 240 and the recording medium 250 is shorter than λ/4, the near field is formed, some parts of the incident light beam of more than the threshold angle arrive at record layers via the recording medium 250 without touching the lens unit 240 with the recording medium 250. Therefore, the less the interval (g1) between the lens unit 240 and the recording medium 250, the larger the quantity of light passing through the recording medium 250, the higher the quantity of light fully reflected from the recording medium 250. As a result, the relationship of FIG. 12 is made. So, as shown in FIG. 12, the intensity of the GE signal proportional to the intensity of the reflected light beam exponentially increases in the near field as the interval (g1) gradually increases. If the gap-error (GE) signal escapes from the near field, the gap-error (GE) signal may have a predetermined value (i.e., a maximum value). Based on the above-mentioned principles, the gap-error (GE) signal may have a predetermined value on the condition that the interval (g1) between the lens unit 240 and the recording medium 250 is regularly maintained. In other words, the gap-error (GE) signal is feedback-controlled to have a predetermined value, so that the interval (2g) between the lens unit 240 and the recording medium 250 can be regularly controlled.

A method for regularly maintaining the interval between the lens unit 240 and the recording medium 250 using the gap-error (GE) signal will hereinafter be described with reference to FIG. 21.

Figure 21:
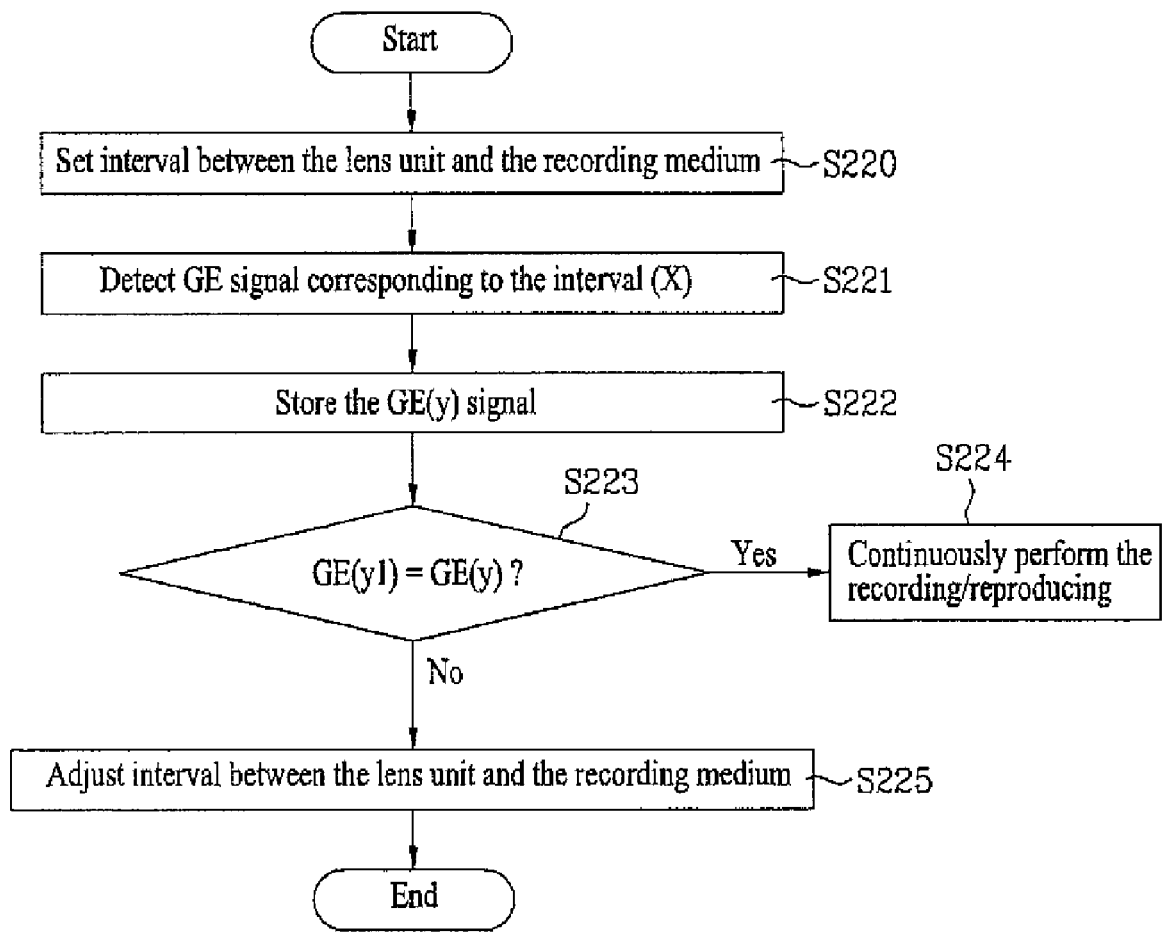
FIG. 21 is a flow chart illustrating a control method of the recording/reproducing apparatus according to one embodiment of the present invention.
Figure 22:
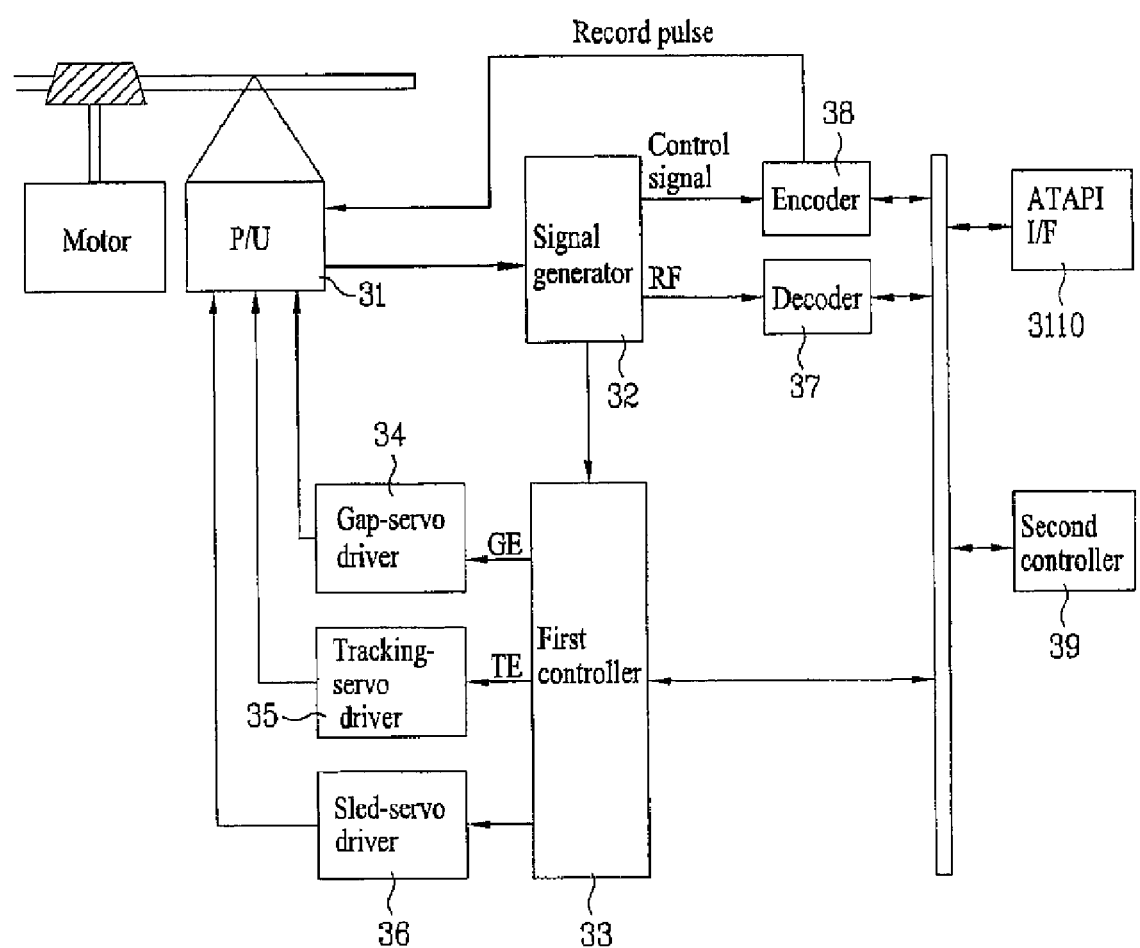
FIG. 22 is a flow chart illustrating a recording/reproducing apparatus according to another embodiment of the present invention.

Referring to FIG. 21, the recording/reproducing apparatus establishes the interval (x) between the first lens unit 240 suitable for detecting the reflected light beam and the recording medium 250 at step S220. The apparatus detects the gap-error (GE) signal (y) detected from the established interval (x) at step S221. The apparatus stores the gap-error (GE) signal (y) at step S222. In this case, "y" may be higher than 10~20% of the near-field limit (2λ/4), such that the possibility of a collision between the lens unit 240 and the recording medium 250 is not high in level. Also, "y" may be less than 80~90% of the near-field limit (2λ/4), such that the possibility of escaping from the near field between the lens unit 240 and the recording medium 240 is not high in level. The above-mentioned steps may be performed before the recording/reproducing process of data in the recording medium 250.

While data is recorded or reproduced in/from the rotating recording medium 250, the distorted-polarization light beam is reflected from the track of the recording medium 250, and is then received in the third light receiving unit 270. The signal generator 22 generates the gap-error (GE) signal upon receiving the output signal from the third light receiving unit 270. In this case, the apparatus determines whether the detected gap-error (GE) signal (y1) is equal to the stored gap-error (GE) signal (y) at step S223.

If the detected gap-error (GE) signal (y1) is equal to the stored gap-error (GE) signal (y) at step S223, it is considered that the established interval has been maintained, such that the recording/reproducing process is continuously executed at step S224. Otherwise, if the detected gap-error (GE) signal (y1) is different from the stored gap-error (GE) signal (y) at step S223, it is considered that the established interval has been changed, such that the apparatus can adjust the interval between the lens unit 240 and the recording medium 250 by driving the lens unit 240. In this way, the lens unit 240 is feedback-controlled by the gap-error signal detected from the recording/reproducing process, such that the interval between the lens unit 240 and the recording medium 250 can be regularly maintained.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Figure 23:
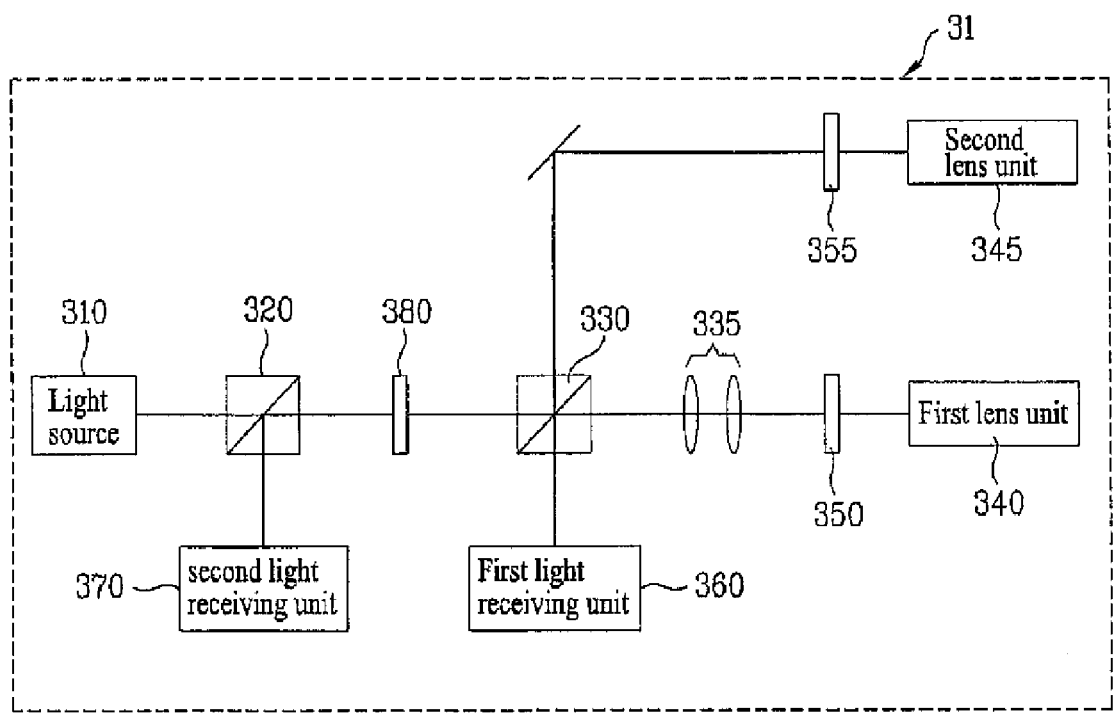
FIG. 23 is a block diagram illustrating an optical pickup device contained in the recording/reproducing apparatus of FIG. 22 according to the present invention.

FIG. 23 is a block diagram illustrating the recording/reproducing apparatus according to another embodiment of the present invention. The recording/reproducing apparatus of FIG. 23 will hereinafter be described with reference to other annexed drawings.

Referring to FIG. 23, the optical pickup device (P/U) 31 irradiates the light beam on the recording medium, receives the light beam reflected from the recording medium, and generates an electric signal corresponding to the reflected light beam. Detailed descriptions of the optical pickup device 31 will hereinafter be described in detail.

The signal generator 32 receives the electric signal from the optical pickup device 31, and generates the recording/reproducing signal (RF) required for reproducing data, the gap-error (GE) signal for controlling the servo, and a tracking-error signal (TE).

The first controller 33 receives the output signal from the signal generator 32, and generates a control signal or a drive signal. For example, the first controller 33 performs signal processing on the GE signal, such that it outputs a drive signal for controlling the interval between the lens unit 340 and the recording medium to the gap servo driver 34. For another example, the first controller 33 performs signal processing on the track-error (TE) signal, such that it outputs a drive signal for controlling the tracking to the tracking servo driver 35.

Also, the first controller 33 may output a drive signal for changing the focusing position on the recording medium to either the gap-servo driver 34 or the focus driver (not shown). Otherwise, the first controller 33 discriminates the loaded recording medium, and may adjust a voltage signal applied to the polarization adjusting unit according to the discriminated result of the recording medium. For this purpose, the first controller 33 includes a decision unit for discriminating the loaded recording medium, and a voltage adjusting unit for controlling the voltage signal applied to the polarization adjusting unit according to the discriminated result of the recording medium. In more detail, the decision unit acquires information of a recording-medium thickness and information of a record-layer position on the basis of the optical signal acquired from the recording-medium scanning process of the light beam, such that it discriminates the recording-medium type. The voltage adjusting unit controls the voltage signal applied to the polarization adjusting unit, such that the light beam is incident to a corresponding lens unit according to recording-medium categories. In this case, the voltage adjusting unit may serve as a switch for powering on or off the voltage signal, or may adjust the magnitude of this voltage signal.

The gap-servo driver 34 drives the actuator (not shown) contained in the optical pickup device 31, such that the optical pickup device 31 or its lens unit (not shown) moves in an optical-axis direction. As a result, the interval between the lens unit 340 and the recording medium can be regularly maintained. The gap-servo driver 34 drives an actuator (not shown) contained in the optical pickup device 31, such that the optical pickup device 31 or the lens unit moves in an optical-axis direction. If the gap-servo driver 34 has no additional focus driver, it drives the actuator contained in the optical pickup device 31, such that the focus adjusting unit 335 moves in the optical-axis direction. In this case, if the gap-servo driver 24 has an additional focus driver, this additional focus driver moves the focus adjusting unit 335 in the optical-axis direction according to a drive signal of the controller 33.

The tracking-servo driver 35 drives the actuator (not shown) contained in the optical pickup device 31, such that the optical pickup device 31 or the lens unit 340 moves in the radial direction, resulting in the correction of an erroneous light beam position. As a result, the optical pickup device 31 or its lens unit 340 may follow a predetermined track contained in the recording medium. The tracking-servo driver 35 may move the optical pickup device 31 or its lens unit 340 in the radial direction according to the track moving command.

The sled-servo driver 36 drives the sled motor (not shown) to move the optical pickup device 31, such that the optical pickup device 31 moves in the radial direction according to a moving command on a track.

A host such as a personal computer (PC) can be connected to the above-mentioned recording/reproducing apparatus. This recording/reproducing apparatus is called a drive. The host receives the recording/reproducing command from the second controller 39 via the interface. The second controller 39 controls the decoder 37, the encoder 38, and the controller 33 upon receiving the recording/reproducing command from the host. In this case, the above interface may be implemented with an Advanced Technology Attached Packet Interface (ATAPI) 3110. In this case, the ATAPI 3110 is an interface standard between the optical recording/reproducing apparatus such as a CD- or DVD-drive and the host, and has been proposed to transmit data decoded by the optical recording/reproducing apparatus to the host. The ATAPI 3110 converts the decoded data into a packet-format protocol capable of being processed by the host, and transmits the packet-format protocol. Therefore, the optical recording/reproducing apparatus receives playback data from the decoder 37, and transmits data to be recorded to the encoder 38, such that it records or reproduces data in/from the recording medium.

The optical system (not shown) contained in the optical pickup device 31 according to one embodiment of the present invention will hereinafter be described in detail.

FIG. 23 is a block diagram illustrating an exemplary optical system contained in the optical pickup device 31 according to the present invention.

Referring to FIG. 23, the optical system includes a light source 310, beam splitters 320 and 330, a focus adjusting unit 335, a lens unit 340, light receiving units 360 and 370, and a polarization adjusting unit 380. In this case, the optical system determines whether the light beams must be separated from each other, such that it may further include at least one beam splitter according to the determined result. In this embodiment, for the convenience of description and better understanding of the present invention, the optical system may include a first beam splitter 320, a second beam splitter 330, first and second light receiving units 360 and 370 for receiving the light beam separated by the beam splitter.

The light source 310 may be implemented with a laser beam having superior straightness. In more detail, the light source 310 may be implemented with a laser diode. The light beam, which emerges from the light source 310 and is irradiated on the recording medium, may be a parallel light beam. Therefore, the optical pickup device may include a lens (e.g., a collimating lens 315) which converts a light beam emerged from the light source 310 into a parallel light beam. That is, the collimating lens 315 may be arranged on the path of a light beam emerged from a point light, such that the path of the light beam is changed, resulting in the occurrence of a parallel light beam.

The beam splitter 320 or 330 may separate light beams incident from the same direction from each other, or may synthesize other light beams incident from different directions. In this embodiment of the present invention, a first beam splitter 320 and a second beam splitter 330 exist, and detailed descriptions thereof will hereinafter be described in detail.

In this embodiment, the first beam splitter 320 passes only some parts of the incident light beam and reflects the remaining parts, and may be implemented with a non-polarized beam splitter (NBS) as an example. The second beam splitter 330 passes only specific-directional polarization according to the polarization direction. In this embodiment, the second beam splitter 330 may be implemented with a polarized beam splitter (PBS) as an example. For example, in the case of using the straight polarization, the polarized beam splitter (PBS) 330 passes only the polarization component (hereinafter referred to as "x-axis polarization") having horizontal vibrations and reflects the other polarization component (hereinafter referred to as "y-axis polarization") having vertical vibrations. Otherwise, the polarized beam splitter (PBS) 330 passes only the polarization component (hereinafter referred to as "y-axis polarization") having vertical vibrations and reflects the other polarization component (hereinafter referred to as "x-axis polarization") having horizontal vibrations.

In this embodiment, there are two lens units. The lens units irradiate the light beam emitted from the light source 310 on the recording medium, and condense the light beam reflected from the recording medium 150. In this case, the two lens units irradiate the light beam at different positions on the recording medium, such that data can be recorded or reproduced in/from the recording medium in different ways. For the convenience of description and better understanding of the present invention, the first lens unit 340 corresponds to a lens unit for use in a near-field recording medium, and the second lens unit 345 corresponds to a lens unit for use in a far-field recording medium such as a BD or DVD. In this case, a single light source is used, such that it is assumed that the wavelength of the first lens unit 340 is equal to that of the second lens unit 345. In this case, the second lens unit 345 includes an objective lens which has been manufactured in consideration of a numerical aperture (NA). The first lens unit 340 capable of forming the near field will hereinafter be described with reference to FIG. 24.

Figure 24:
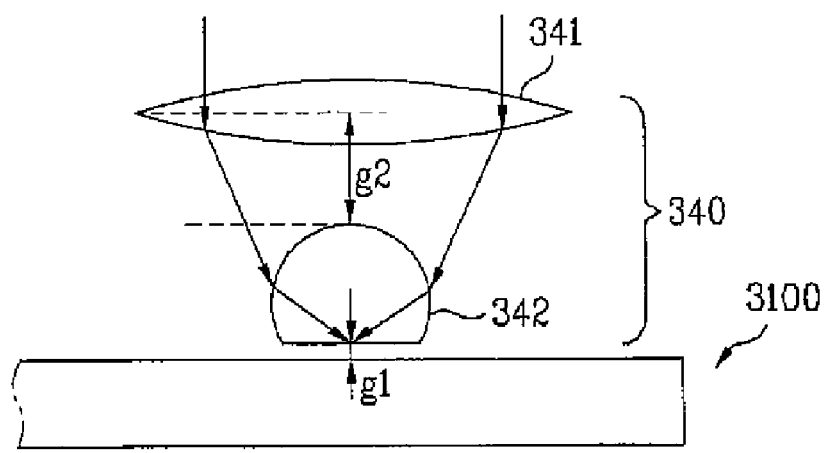
FIG. 24 is a cross-sectional view illustrating the lens unit of FIG. 23 and a recording medium according to the present invention.

The first lens unit 340 includes a high-refraction lens as well as the objective lens 341, increases a numerical aperture (NA), and forms Evanescent waves, such that it forms the near field. FIG. 24 is a cross-sectional view illustrating the lens unit of FIG. 23 and the recording medium according to the present invention. As shown in FIG. 24, the first lens unit 340 includes the objective lens 341 and the high-refraction lens 342. The high-refraction lens 342 is arranged on the optical path from the objective lens 341 to the recording medium 3100. In this present invention, the objective lens 341 and the high-refraction lens 342 contained in the first lens unit 340 can be modified in various ways, and detailed descriptions thereof will hereinafter be described with reference to the annexed drawings. The above-mentioned high-refraction lens 342 is hereinafter referred to as a "near-field lens".

Figure 25:
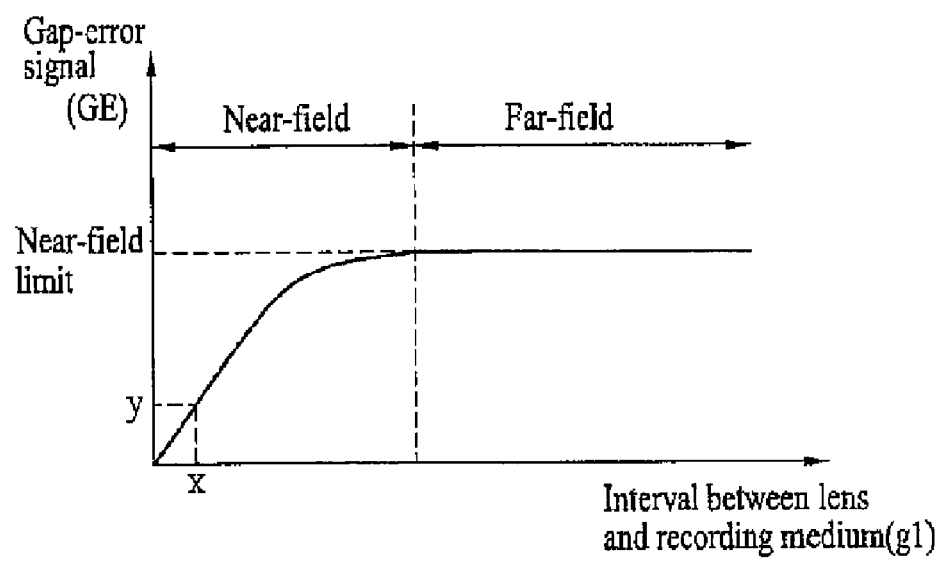
FIG. 25 is a graph illustrating a gap-error (GE) signal variation depending on the interval between a lens unit and a recording medium according to the present invention.

In a recording/reproducing apparatus based on the near field, an optical system of the optical pickup device 31 including the first lens unit 340 must be very close to the recording medium 3100. As shown in FIG. 25, the interval (denoted by "3g1") between the near field lens 342 and the recording medium 31000 must be equal to or less than an interval denoted by nanometers. In more detail, the relationship between the first lens unit 340 and the recording medium 3100 will hereinafter be exemplarily described in detail.

If the interval between the first lens unit 340 and the recording medium 3100 is equal to or less than about ¼ (i.e., λ/4) of an optical wavelength, some parts of the light beam, which has been received in the first lens unit 340 at a threshold angle or more, are not fully reflected from the surface of the recording medium 3100, and form Evanescent waves. The Evanescent waves pass through the recording medium 3100, and arrive at record layers. These Evanescent waves arrived at the record layers may be used to record or reproduce data. As a result, by the light beam under the diffraction limit, high-density bit information can be stored in the recording medium, However, if the interval between the first lens unit 340 and the recording medium 3100 is longer than λ/4, the optical wavelength loses unique characteristics of Evanescent waves and returns to its original wavelength, and the light beam is fully reflected from the surface of either the recording medium 3100 or the near field lens 342. In this case, the Evanescent waves cannot be formed, such that the recording/reproducing operation caused by the near field cannot be performed.

Figure 29:
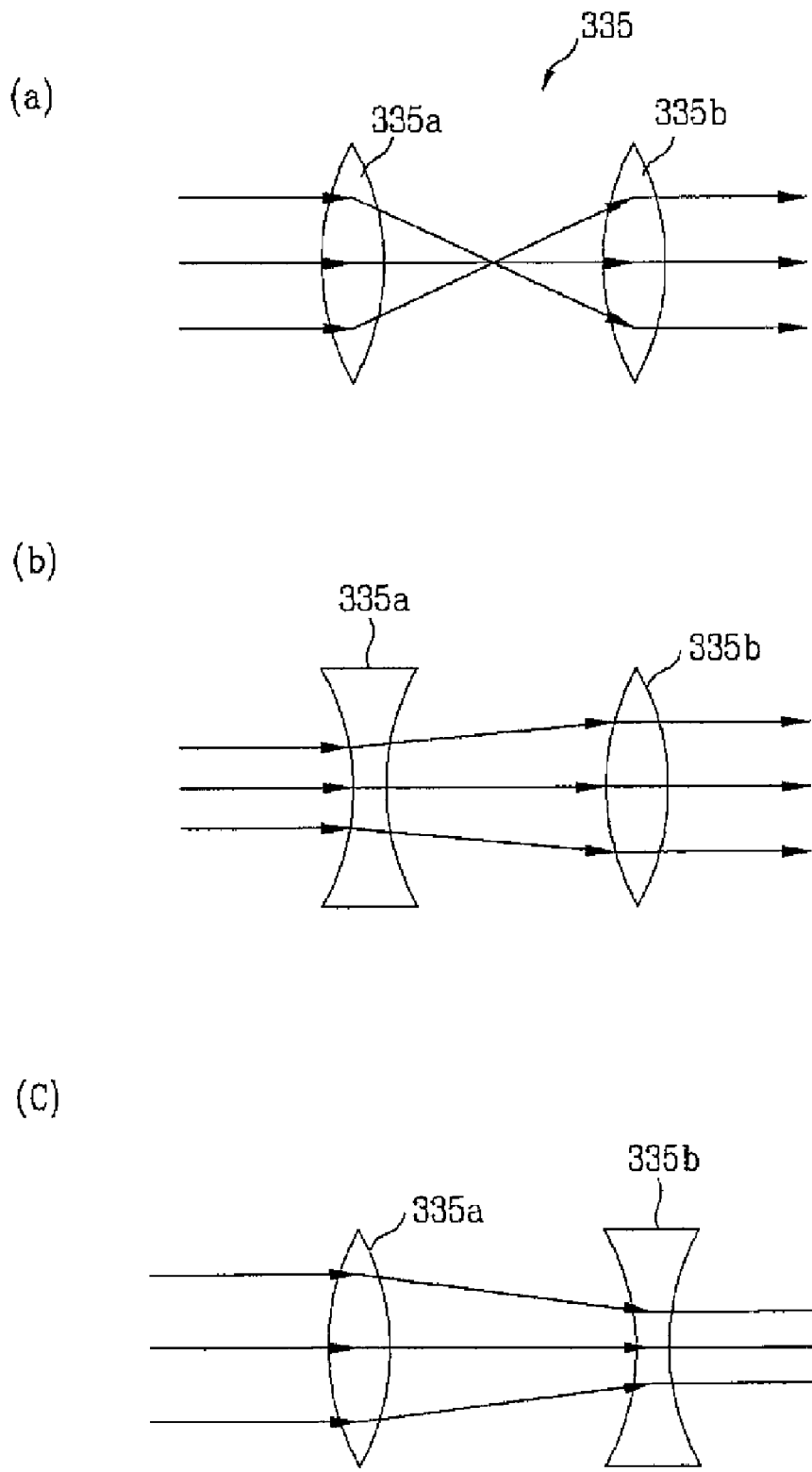
FIGS. 29A~29C show a focus adjusting unit according to the present invention.

Generally, in a near-field recording/reproducing apparatus, the interval between the first lens unit 340 and the recording medium 3100 is controlled to be less than about λ/4. In this case, it should be noted that the value of λ/4 is used as a near-field limit. In this embodiment, if the above method for maintaining the nanometer-level interval controls the gap-servo driver according to the interval control signal, exemplary operations of this embodiment will hereinafter be described in detail. Associated detailed descriptions will be described later with reference to FIGS. 8 and 29.

Also, the interval between the objective lens 341 and the near-field lens 342 must satisfy the range of a predetermined interval. As shown in FIG. 24, the interval (g2) between the objective lens 341 and the near-field lens 342 may be denoted by micrometers, and the interval size may be experimentally or calculatedly determined. In order to allow the light beam incident to the objective lens 341 to enter the near-field lens 342, determining the interval between the objective lens 341 and the near-field lens 342 is considered to be important. For this purpose, the interval (g2) may be set to the range of about 100 μm.

As described above, the interval between the near-field lens 342 and the recording medium 3100 must be maintained at a nanometer-level interval. The interval between the objective lens 341 and the near-field lens 342 must not escape from such a micrometer-level interval. If a user moves the objective lens 341 from the micrometer-level interval to another position to change a light-focusing position on the recording medium 3100 to another position, sub-ranges ⅟10~⅟100 of the above-mentioned interval must also be controlled. As a result, in fact, moving the objective lens 341 to change the focusing position, simultaneously while maintaining the relationship between the objective lens 341 and the near-field lens 342 is very difficult to be implemented. Therefore, the present invention may further include a focus adjusting unit 335 capable of changing the focusing position under the condition the objective lens 341 and the near-field lens 342 have been fixed at specific positions.

Figure 28:
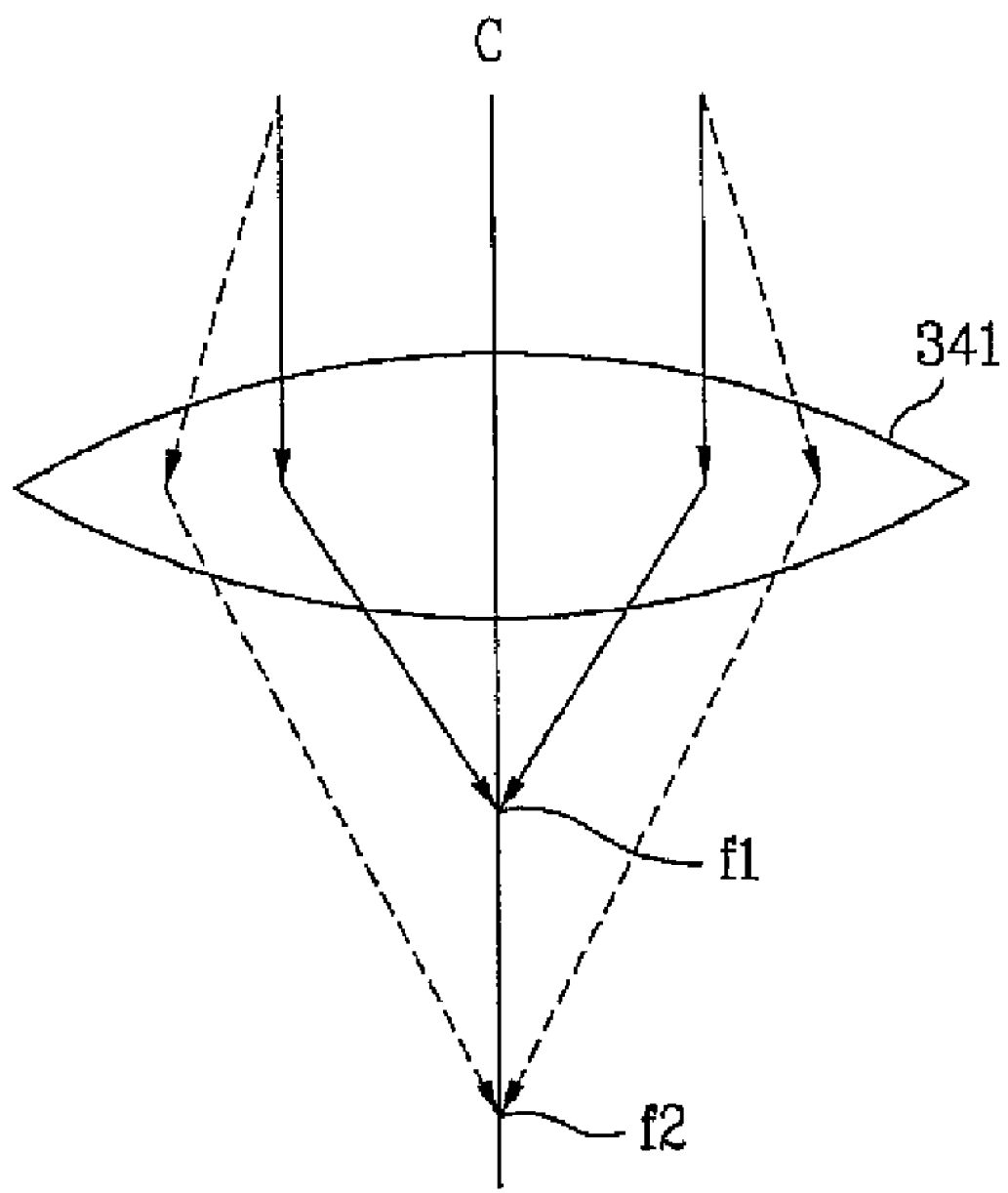
FIG. 28 shows not only an optical-path variation caused by a focus adjusting unit but also an objective lens according to the present invention.

The focus adjusting unit 335 may be used to change the position of the light beam focused on the multi-layered recording medium 3100 including one or more record layers. For example, the focus adjusting unit 335 changes an incident angle of the light beam incident to the objective lens 341 to another incident angle, resulting in the change of a focal length. In FIG. 28, a solid line indicates the path of a light beam, which is incident to the objective lens 341 in parallel. This parallel light beam incident to the objective lens 341 has a focal length by which the parallel light beam is focused at the position of f1. In the meantime, the dotted line of FIG. 26 illustrates that the incident angle of the light beam incident to the objective lens 341 is changed to another angle. If the light beam passing through the focus adjusting unit 335 diverges and enters the objective lens 341 via the path such as the dotted line, the light beam refracted at the objective lens 341 has a predetermined focal length by which the light beam is focused at the position of f2. In other words, the path of the light beam incident to the objective lens 341 is changed to another path, such that the light beam may be focused at different positions on the recording medium 3100. As a result, although the objective lens 341 is fixed at a specific position, the position focused on the recording medium 3100 may be changed to another position. Therefore, the direction of the incident light beam must be maintained without any change, or must diverge or converge, in such a way that the direction of the incident light beam needs to be adjusted. In this embodiment, the focus adjusting unit 335 is used to adjust the direction of the incident light beam.

A detailed example of the focus adjusting unit 335 is shown in FIG. 8. In FIG. 8, the focus adjusting unit 335 may be used to maintain the path of the incident light beam without any change, or may control the path of the incident light beam to diverge or converge. In this case, the focus adjusting unit 335 must be designed to maintain the direction of the incident light beam without any change. The focus adjusting unit 335 may include a combination of at least one convex lens and at least one concave lens.

The light receiving units 360 and 370 of FIG. 23 receive the reflected light beam, perform photoelectric conversion on the received light beam, and generate an electric signal corresponding to a quantity of light of the reflected light beam. In this embodiment, the present invention exemplarily includes a first light receiving unit 360 and a second light receiving unit 370 for the convenience of description and better understanding of the present invention. The first light receiving unit 360 and the second light receiving unit 370 may be implemented with two photo-diodes PDA and PDB, each of which splits into a predetermined number of sections (e.g., 2-section) in either a signal track direction or a radial direction of the recording medium 3100. In this case, the photo-diodes PDA and PDB output electric signals (a,b) proportional to the received light quantity, respectively. Otherwise, the light receiving units 360 and 370 may also be implemented with four photo-diodes PDA, PDB, PDC, and FDD, each of which splits into a predetermined number of sections (e.g., 4-section) in either a signal track direction or a radial direction of the recording medium 3100. In this case, the light receiving elements contained in the light receiving unit 360 or 370 are not limited to the above-mentioned examples, and can also be implemented with other modifications as necessary.

Figure 26A:
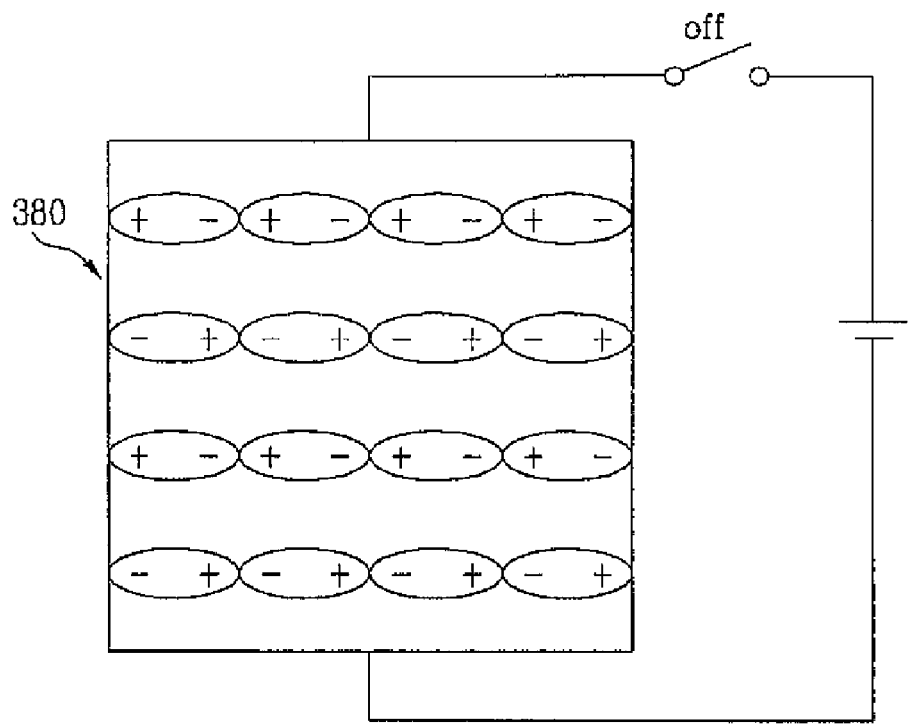
FIGS. 26A~26B show a polarization adjusting unit according to the present invention.
Figure 26B:
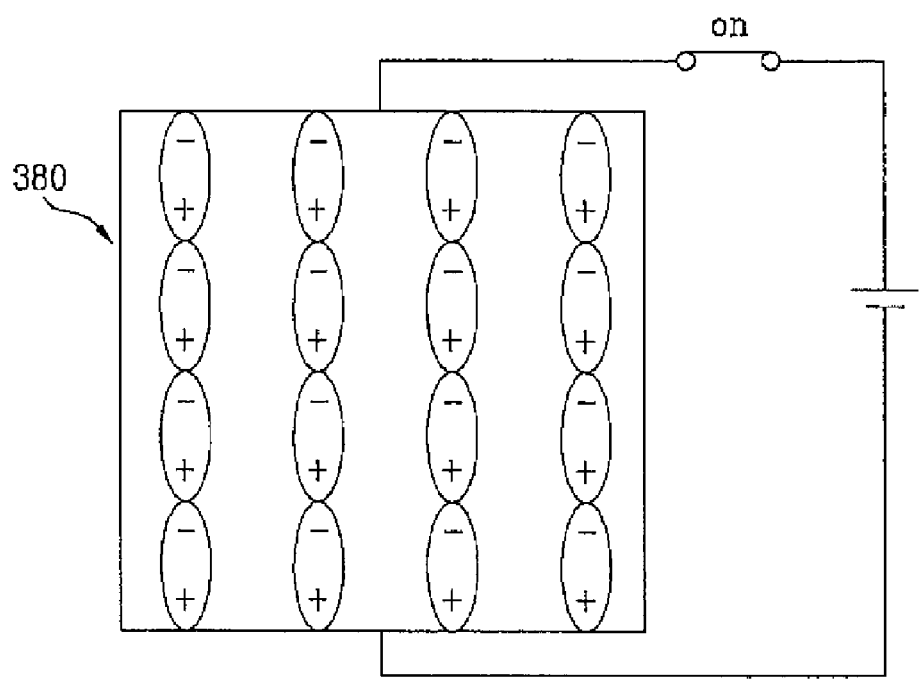

The polarization adjusting unit 380 is used to adjust the polarizing direction of the light beam according to a applied voltage, such that the polarizing direction of the light beam passing through the polarization adjusting unit 380 is adjusted according to the applied voltage. For the convenience of description, the polarization adjusting unit 380 will hereinafter be described with reference to FIGS. 26A and 26B. FIGS. 26A~26B show the polarization adjusting unit according to the present invention. In FIGS. 26A and 26B, the polarization adjusting unit 380 includes polar molecules, and changes arrangement of such molecules according to a applied voltage or the presence or absence of the applied voltage. For example, a liquid crystal may be used to configure the polarization adjusting unit 380. This liquid crystal may include molecules having bar-type polarity, and may change arrangement of the molecules according to a applied voltage.

FIG. 26A shows the polarization adjusting unit 380 when no voltage is received. If the linearly-polarized light beam enters the polarization adjusting unit 380, only X-axis polarization components can pass through the polarization adjusting unit 380. If the voltage is applied to the polarization adjusting unit 380, the polar molecules contained in the polarization adjusting unit 380 can be arranged in the form of FIG. 26B. In this case, if the linearly-polarized light beam enters the polarization adjusting unit 380, the polarization adjusting unit 380 passes only Y-axis polarization components. That is, the polarizing direction of the light beam passing through the polarization adjusting unit 380 can be selected according to the presence or absence of a applied voltage. Otherwise, the degree of twist can be determined according to both a voltage signal received in the polarization adjusting unit 380 and the strength of the voltage signal. In this case, the direction of vibration of the polarization component, which passes through the polarization adjusting unit 380 within the range of a maximum angle of 90°, can be decided by the adjusting of the applied voltage.

In the optical pickup device 31 of the recording/reproducing apparatus, the flow of signals of the optical system based on the path of the light beam emitted from the light source 310 will hereinafter be described in detail.

The light beam emitted from the light source 310 of the optical pickup device 31 is incident to the first beam splitter 320 (i.e., the non-polarized beam splitter (NBS)), such that some parts of the incident light beam are reflected, and other parts are incident to the polarization adjusting unit 380.

Figure 27A:
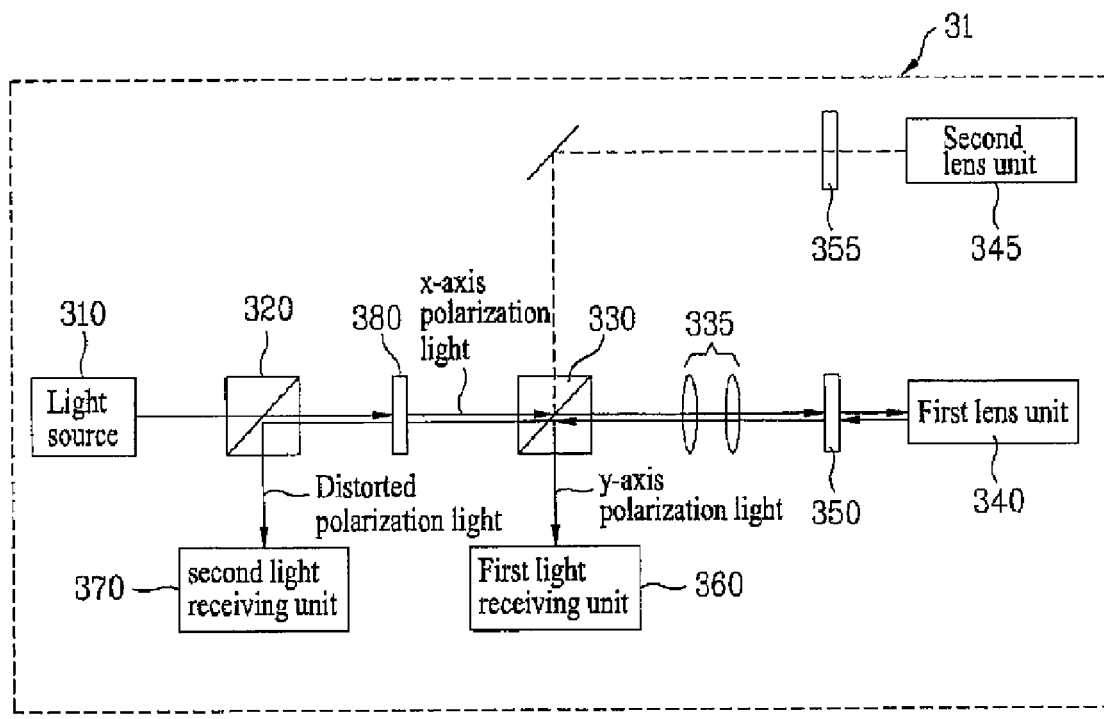
FIGS. 27A~27B are block diagrams illustrating the flow of optical signals caused by the variation of the polarization adjusting unit contained in the optical system of FIG. 23 according to the present invention.

If no voltage signal is received in the polarization adjusting unit 380 as shown in FIG. 26A, the X-axis polarization component passes through the polarization adjusting unit 380, and is incident to the second beam splitter 330 (i.e., the polarized beam splitter (PBS)). So, the X-axis polarization light beam is incident to the first lens unit 340 as shown in FIG. 27A. That is, if a near-field recording medium is loaded in the recording/reproducing apparatus, the apparatus may record or reproduce data in/from the near-field recording medium using the first lens unit 340. In this case, if the multi-layered recording medium is loaded in the apparatus, the position of a focused record layer may be changed by the focus adjusting unit 335.

The polarization conversion plane 350 located at an incident path of the light beam received in the first lens unit 340 is a quarter wave plate (QWP), which is an optical element for rotating the polarization direction of the reflected light beam by 90 degrees. The polarization conversion plane 350 performs left-hand circular polarization (LHCP) of the light beam incident to the recording medium 3100, and performs right-hand circular polarization (RHCP) of the reflected light beam traveling in an inverse direction. As a result, the polarization direction of the reflected light beam received from the QWP is changed in another direction different from that of the incident light beam, and the above two polarization directions are 90 degrees out of phase with each other. Therefore, the light beam, having only X-axis polarization components by the polarized beam splitter (PBS) 330, is incident to the first lens unit 340, is reflected from the recording medium 3100, and is incident to the polarized beam splitter (PBS) 330, such that the resultant light beam has Y-axis polarization components. So, the Y-axis polarization components are reflected from the polarized beam splitter (PBS) 330, and the reflected light beam is incident to the first light receiving unit 360.

Figure 27B:
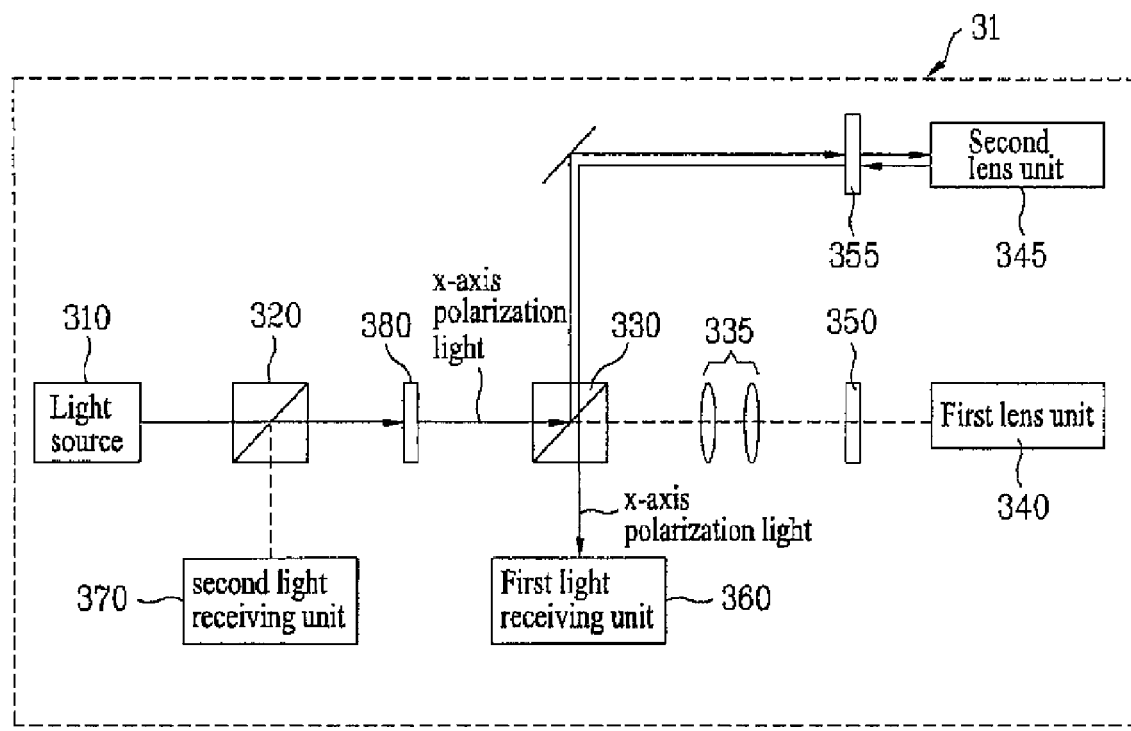

In the meantime, if the voltage of more than a predetermined magnitude is applied to the polarization adjusting unit 380 as shown in FIG. 26B, the Y-axis polarization components is incident to the polarized beam splitter (PBS) 330 after passing through the polarization adjusting unit 380. The polarized beam splitter (PBS) 330 reflects the Y-axis polarization components. Therefore, the Y-axis polarization light beam is incident to the second lens unit 345 as shown in FIG. 27B. The polarization conversion plane 355 may also be arranged on the incident path of the light beam received in the second lens unit 345. Accordingly, the reflected light beam is converted into the X-axis polarization component due to the above-mentioned principles, and passes through the polarized beam splitter (PBS) 330. As a result, the reflected light beam is received in the first light receiving unit 360. In this case, there is no need for the polarization directions to be perpendicular to each other, and it is preferable that the polarization directions be separated from each other by the polarized beam splitter (PBS) 330.

In the meantime, in the case of using the first lens unit 340, the numerical aperture (NA) of the first lens unit 340 is higher than "1", such that the polarization direction of the light beam may be distorted when the light beam is irradiated and reflected from the first lens unit 340. That is, as shown in FIG. 27A, some parts of the reflected light beam incident to the polarized beam splitter 330 pass through the polarized beam splitter 330 due to the distorted polarization direction. The resultant reflected light beam is incident to the polarized beam splitter 320. The polarized beam splitter 320 passes some parts of the received light beam, and reflects the remaining parts. As a result, the light beam reflected from the polarized beam splitter 320 is incident to the polarized beam splitter 370.

In other words, if the near-field recording medium is loaded, data can be recorded or reproduced using the first lens unit 340. If the far-field recording medium is loaded, data can be recorded or reproduced using the second lens unit 345. In this case, the term "far-field" may indicate all the cases, each of which disuses the near field.

Figure 30:
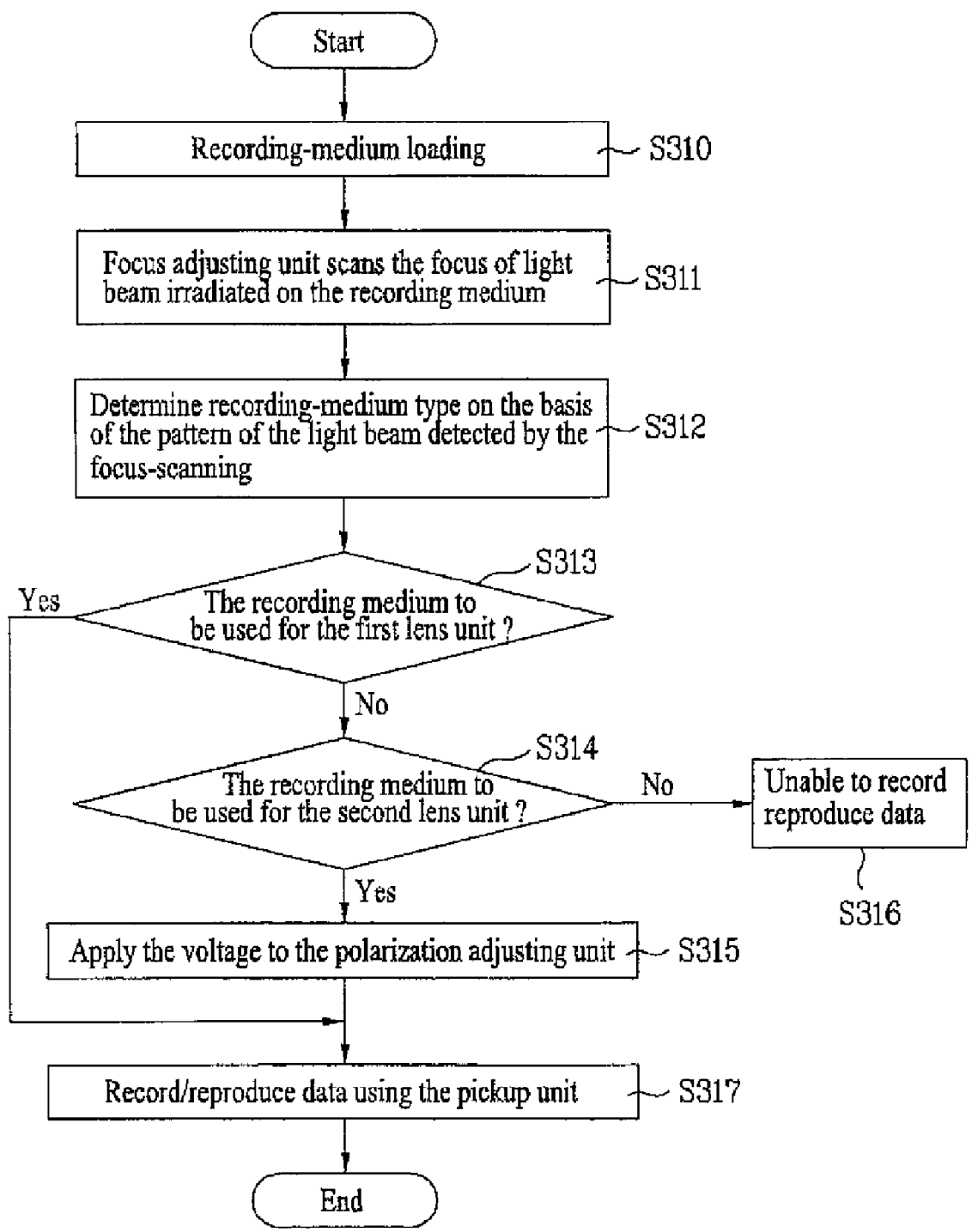
FIG. 30 is a flow chart illustrating a recording/reproducing method according to one embodiment of the present invention.

FIG. 30 is a flow chart illustrating a recording/reproducing method according to one embodiment of the present invention.

A method for controlling a path of the light beam using the polarization adjusting unit 380 in order to allow the light beam to be incident to the first lens unit 340 or the second lens unit 345 will hereinafter be described in detail.

Referring to FIG. 30, if the recording medium is loaded in the recording/reproducing apparatus at step S310, a decision unit (not shown) of the first controller 33 drives the focus adjusting unit 335, such that the focus of the light beam irradiated on the loaded recording medium is scanned at step S311. By the pattern of the light beam detected in the above focus-scanning process, the apparatus determines the type or the characteristic of the loaded recording medium at step S312. For example, the apparatus determines either the thickness of the recording medium or the position of the record layer on the basis of the optical pattern. As a result, the apparatus can determine whether the loaded recording medium is a near-field recording medium, a blu-ray recording medium, a HD-DVD, or a DVD.

As shown in FIG. 23, according to the above determined result, the voltage adjusting unit (not shown) of the first controller 33 in the recording/reproducing apparatus including two lens units determines whether the focus adjusting unit 380 receives a voltage signal or the strength of the applied voltage signal. Associated detailed description will hereinafter be described with reference to FIGS. 26A and 26B. In other words, in the case of using the first lens unit 340 according to the determined result of the recording medium, the apparatus may record or reproduce data under the condition that no voltage signal has been received in the polarization adjusting unit 380. In the case of using the second lens unit 345 according to the determined result of the recording medium, the apparatus applies a voltage signal to the polarization adjusting unit 380, such that data can be recorded or reproduced using the second lens unit 345 at step S317. In the meantime, if the recording medium does not use the first and second lens units 340 and 345, data cannot be recorded and reproduced at step S316.

The first light receiving unit 360 and the second light receiving unit 370 of FIG. 23 output electric signals corresponding to a quantity of light of the received reflected light beam. Each light receiving unit may include at least one photo-diode, but it may be modified in various ways. For the convenience of description, in this embodiment, it is assumed that each of the first light receiving unit 360 and the second light receiving unit 370 includes two photo-diodes. The two photo-diodes of the first light receiving unit 360 output electric signals "a" and "b" corresponding to the quantity of received light. It is assumed that two photo-diodes of the second light receiving unit 370 output electric signals "c" and "d" corresponding to a quantity of received light.

The signal generator 32 generates the gap-error (GE) signal, the tracking-error (TE) signal, or the recording/reproducing signal (RF) using the electric signals received from the light receiving units 360 and 370.

The signal generator 32 generates the recording/reproducing signal (RF) or the tracking-error (TE) signal using the reflected light beam received in the first light receiving unit 360. This RF signal may be represented by RF=a+b according to the sum of output signals of the photo-diodes of the first light receiving unit 360. The tracking-error (TE) signal may be represented by TE=a−b according to a difference signal between output signals of the photo-diodes.

The signal generator 32 may generate the gap-error (GE) signal configured to control the interval between the lens and the recording medium 3100 upon receiving the output signals (c,d) from the second light receiving unit 360. The gap-error (GE) signal may be generated by the sum of output signals of the photo-diodes of the second light receiving unit 370. This gap-error (GE) signal can be represented by the following equation 2:

$$GE = a + b \quad \text{[Equation 2]}$$

In this case, the gap-error (GE) signal is equal to the sum of all electric signals corresponding to the quantity of light, such that it is proportional to the quantity of reflected light received in the second light receiving unit 370.

As shown in FIG. 25, within the scope of a near field, the gap-error (GE) signal exponentially increases as the interval (g1) between the first lens unit 340 and the recording medium 3100 gradually increases. In a far field out of the near field, the gap-error (GE) signal has a regular size or magnitude, and detailed description thereof will hereinafter be described in detail. If the interval (g1) between the first lens unit 340 and the recording medium 3100 escapes from the near field, namely, if the interval (g1) is longer than λ/4 indicative of the near-field limit (i.e., the boundary between the near field and the far field), the incident light beam of more than a threshold angle is fully reflected from the recording medium 3100. Otherwise, if the interval (g1) between the first lens unit 340 and the recording medium 3100 is shorter than λ/4, the near field is formed, some parts of the incident light beam of more than the threshold angle arrive at record layers via the recording medium 3100 without touching the lens unit 340 with the recording medium 3100. Therefore, the shorter the interval (g1) between the lens unit 340 and the recording medium 3100, the larger the quantity of light passing through the recording medium 3100, the less the quantity of light fully reflected from the recording medium 3100. The longer the interval (g1) between the lens unit 340 and the recording medium 3100, the less the quantity of light passing through the recording medium 3100, the higher the quantity of light fully reflected from the recording medium 3100. As a result, the relationship of FIG. 12 is made. So, as shown in FIG. 25, the intensity of the GE signal proportional to the intensity of the reflected light beam exponentially increases in the near field as the interval (g1) gradually increases. If the gap-error (GE) signal escapes from the near field, the gap-error (GE) signal may have a predetermined value (i.e., a maximum value). Based on the above-mentioned principles, the gap-error (GE) signal may have a predetermined value on the condition that the interval (g1) between the lens unit 340 and the recording medium 3100 is regularly maintained. In other words, the gap-error (GE) signal is feedback-controlled to have a predetermined value, so that the interval (g) between the lens unit 340 and the recording medium 3100 can be regularly controlled.

A method for regularly maintaining the interval between the lens unit 340 and the recording medium 3100 using the gap-error (GE) signal will hereinafter be described with reference to FIG. 31.

Figure 31:
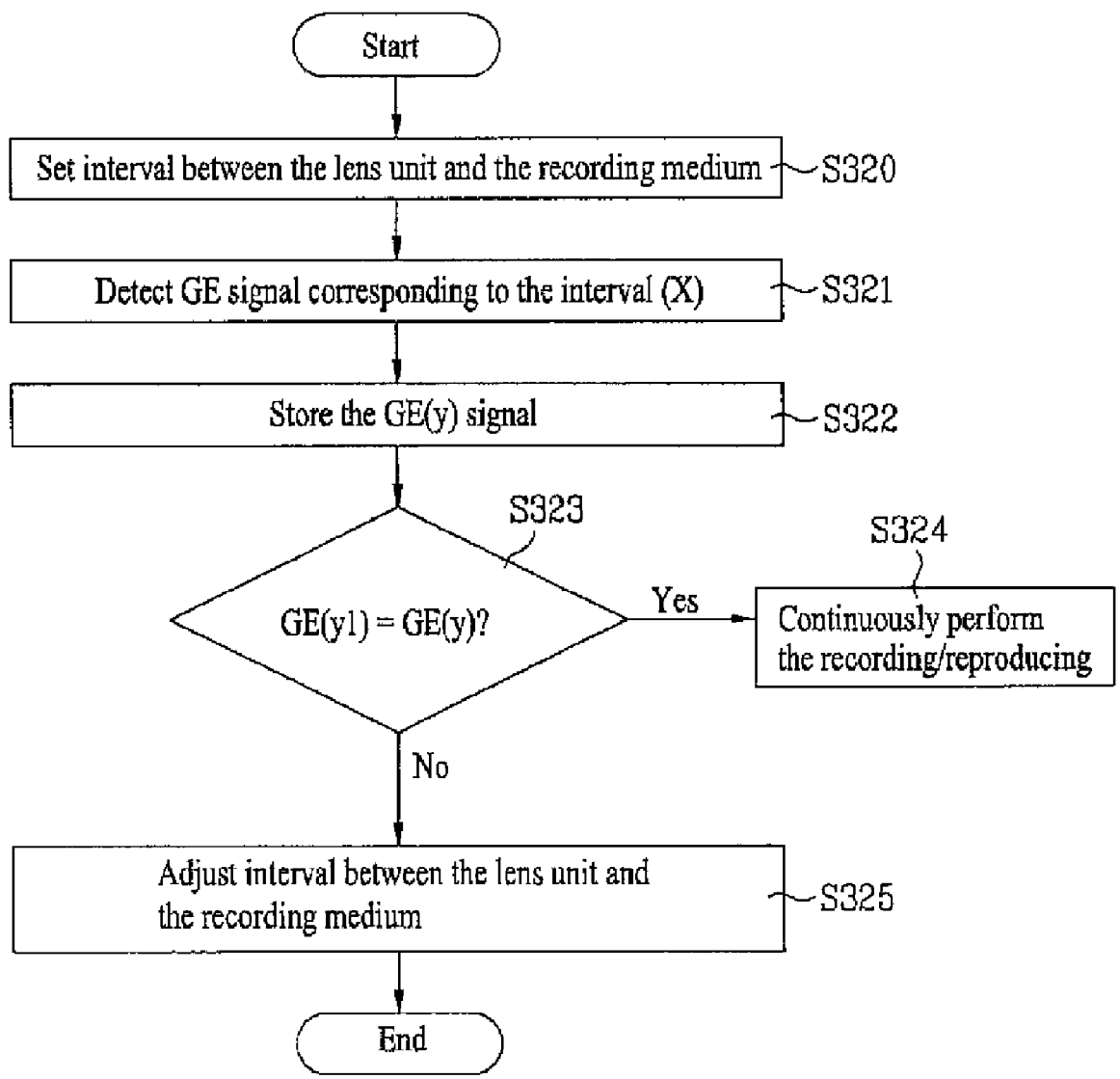
FIG. 31 is a flow chart illustrating a method for controlling an interval according to another embodiment of the present invention.

Referring to FIG. 31, the recording/reproducing apparatus establishes the interval (x) between the first lens unit 340 suitable for detecting the reflected light beam and the recording medium 3100 at step S320. The apparatus detects the gap-error (GE) signal (y) detected from the established interval (x) at step S321. The apparatus stores the gap-error (GE) signal (y) at step S322. In this case, "y" may be higher than 10~20% of the near-field limit (3λ/4), such that the possibility of a collision between the lens unit 340 and the recording medium 250 is not high in level. Also, "y" may be less than 80~90% of the near-field limit (3λ/4), such that the possibility of escaping from the near field between the lens unit 340 and the recording medium 3100 is not high in level. The above-mentioned steps may be performed before the recording/reproducing process of data in the recording medium 3100.

While data is recorded or reproduced in/from the rotating recording medium 3100, the distorted-polarization light beam is reflected from the track of the recording medium 250, and is then received in the second light receiving unit 370. The signal generator 32 generates the gap-error (GE) signal upon receiving the output signal from the second light receiving unit 370. In this case, the apparatus determines whether the detected gap-error (GE) signal (y1) is equal to the stored gap-error (GE) signal (y) at step S323.

If the detected gap-error (GE) signal (y1) is equal to the stored gap-error (GE) signal (y) at step S323, it is considered that the established interval has been maintained, such that the recording/reproducing process is continuously executed at step S324. Otherwise, if the detected gap-error (GE) signal (y1) is different from the stored gap-error (GE) signal (y) at step S323, it is considered that the established interval has been changed, such that the apparatus can adjust the interval between the lens unit 340 and the recording medium 3100 by driving the lens unit 340. In this way, the lens unit 340 is feedback-controlled by the gap-error signal detected from the recording/reproducing process, such that the interval between the lens unit 240 and the recording medium 3100 can be regularly maintained.

As apparent from the above description, the optical pickup device, the recording/reproducing method, and the recording/reproducing apparatus according to the present invention have the following effects. The present invention can effectively access a recording medium including a plurality of record layers, can simultaneously record/reproduce data in/from a plurality of record layers of a recording medium, can record or reproduce data in/from a recording medium using optical polarization characteristics and different lens units. The present invention can simultaneously process data using optical signals having different polarizations, such that it increases a data processing rate.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An optical pickup apparatus comprising:
a light source configured to generate a plurality of light beams having different wavelengths;
an optical-path adjusting unit configured to adjust a path of the plurality of light beams to be irradiated on different record layers of a recording medium, the optical-path adjusting unit including:
a wavelength splitter configured to separate the plurality of light beams generated from the light source according to the wavelengths of the plurality of light beams, and
a diffraction unit configured to diffract the plurality of light beams reflected from the recording medium at different angles according to the wavelengths of the plurality of light beams; and
a light receiving unit configured to separately receive the plurality of light beams diffracted by the diffraction unit and to generate an electric signal corresponding to the separately received light beams by including a plurality of light receiving elements corresponding to a number of the separately received light beams according to the wavelengths of the plurality of light beams.

2. The optical pickup apparatus of claim 1, wherein the wavelength splitter passes through a light beam having a specific wavelength, and splits the remaining light beams other than the light beam among the plurality of light beams into different paths according to the phases of the light beams.

3. The optical pickup apparatus of claim 1, wherein the wavelength splitter has grooves on its surface, such that the light beam incident to the wavelength splitter is passed or diffracted in different directions according to the wavelength of the light beam.

4. The optical pickup apparatus of claim 1, wherein the wavelength splitter maintains or diverts the optical path, such that the light beams having different wavelengths are irradiated on the different record layers of the recording medium, respectively.

5. The optical pickup apparatus of claim 1, wherein an interval between focal points of the light beams irradiated on different positions of the recording medium according to wavelengths of the light beams, corresponds to an interval between the record layers of the recording medium.

6. The optical pickup apparatus of claim 1, wherein the light source generates a first light beam having a first wavelength and a second light beam having a second wavelength different from the first wavelength, and a difference between the first wavelength and the second wavelength is determined to a predetermined value by which the first light beam and the second light beam are irradiated on different record layers of the recording medium, respectively.

7. The optical pickup apparatus of claim 1, further comprising:
a beam splitter configured to separate or synthesize individual paths of the light beams from each other according to polarization directions of the light beam beams.

8. The optical pickup apparatus of claim 1, wherein the light source emits two light beams polarized in different directions,
the optical-path adjusting unit includes:
a beam splitter configured to output the two light beams according to their polarization directions; and
first and second lens units which enable the light beams received from the beam splitter to be irradiated on different positions of the recording medium respectively, and
the light receiving unit includes a first light receiving unit receiving a reflected light beam from the first lens unit after the light beam has been reflected from the recording medium, and a second light receiving unit receiving a reflected light beam from the second lens unit after the light beam has been reflected from the recording medium.

9. The optical pickup apparatus of claim 8, wherein each of the first lens unit and the second lens unit includes an objective lens and a high-refraction lens having a refraction index higher than that of the objective lens.

10. The optical pickup apparatus of claim 9, wherein the second light receiving unit receives a light beam having a distorted-polarization direction, in which the light beam is incident to the first lens unit or the second lens unit.

11. The optical pickup apparatus of claim 10, wherein the second light receiving unit generates a signal corresponding to a quantity of the distorted light received in the second light receiving unit itself, in which the signal is used to generate a gap-error (GE) signal which controls a first interval between the first lens unit and the recording medium or a second interval between the second lens unit and the recording medium.

12. The optical pickup apparatus of claim 11, further comprising:
a lens driver configured to drive the first lens unit or the second lens unit according to the gap-error (GE) signal.

13. The optical pickup apparatus of claim 12, wherein the optical pickup apparatus separately receives the distorted light beam from the first lens unit and the other distorted light beam from the second lens unit, and outputs electric signals which generate a first gap-error signal and a second gap-error signal, respectively, and
the lens driver includes:
a first driver configured to drive the first lens unit by using the first gap-error signal, and
a second driver configured to drive the second lens unit by using the second gap-error signal.

14. The optical pickup apparatus of claim 8, wherein the two light beams polarized in different directions have polarization directions perpendicular to each other.

15. The optical pickup apparatus of claim 8, further comprising:
a first focus adjusting unit configured to adjust a light-focusing position on the recording medium using the first lens unit; and
a second focus adjusting unit configured to adjust a light-focusing position on the recording medium using the second lens unit.

16. The optical pickup apparatus of claim 15, wherein each of the first focus adjusting unit and the second focus adjusting unit includes at least two lenses to adjust an angle of the incident light beam.

17. The optical pickup apparatus of claim 1, wherein the optical-path adjusting unit further includes:
a polarization adjusting unit configured to receive the light beam from the light source, and outputting a light beam having a predetermined polarization direction;
a beam splitter configured to output the light beam according to the polarization direction of the light beam outputted from the polarization adjusting unit; and
first and second lens units which enable the light beam received from the beam splitter to be irradiated on different positions of the recording medium.

18. The optical pickup apparatus of claim 17, wherein the polarization adjusting unit determines the polarization direction of the output light beam according to an applied voltage value.

19. The optical pickup apparatus of claim 18, wherein the polarization adjusting unit includes a plurality of polar molecules.

20. The optical pickup apparatus of claim 18, wherein the polarization adjusting unit includes a liquid crystal, and constituent molecules of which are differently arranged according to the applied voltage.

21. The optical pickup apparatus of claim 18, wherein the polarization direction of the light beam passing through the polarization adjusting unit rotates by 90° according to the presence or absence of the applied voltage.

22. The optical pickup apparatus of claim 21, wherein the beam splitter, if there is no applied voltage, receives a light beam from the polarization adjusting unit, and outputs the received light beam to the first lens unit, and
the beam splitter, if the applied voltage exists, receives a light beam from the polarization adjusting unit, and outputs the received light beam to the second lens unit.

23. The optical pickup apparatus of claim 17, wherein at least one of the first lens unit and the second lens unit is a near-field lens, which includes an objective lens and a high-refraction lens having a refraction index higher than that of the objective lens.

24. The optical pickup apparatus of claim 23, further comprising:
a first light receiving unit configured to receive the light beam reflected from the recording medium, and to generate a recording/reproducing signal for recording/reproducing data; and
a second light receiving unit configured to receive the remaining reflected light beams which are not incident to the first light receiving unit, and to generate an interval-control signal configured to control an interval between the near-field lens and the recording medium.

25. The optical pickup apparatus of claim 17, further comprising:
a focus adjusting unit including at least two lenses to adjust an incident angle of the light beam incident to the near-field lens, and to adjust a focal length using the light beam passing through the near-field lens.

26. A recording/reproducing apparatus comprising:
an optical pickup unit configured to irradiate a light beam on a recording medium to detect an optical signal;
a signal generator configured to generate a control signal by using the optical signal; and
a controller configured to control the optical pickup unit according to the control signal, wherein the optical pickup unit includes:
a light source configured to generate a plurality of light beams having different wavelengths;
an optical-path adjusting unit configured to adjust a path of the light beams to be irradiated on different record layers of a recording medium, the optical path adjusting unit including:
a wavelength splitter configured to separate the light beams generated from the light source according to the wavelengths of the light beams, and
a diffraction unit configured to diffract the light beams reflected from the recording medium at different angles according to the wavelengths of the light beams; and
a light receiving unit configured to separately receive the light beams diffracted by the diffraction unit and to generate an electric signal corresponding to the separately received light beams by including a plurality of light receiving elements corresponding to the number of the separately received light beams according to the wavelengths of the light beams.

27. The recording/reproducing apparatus of claim 26, wherein the light source emits two light beams polarized in different directions,
the optical-path adjusting unit further includes:
a beam splitter configured to output the light beams emitted from the light source according to their polarization directions; and
first and second lens units which enable the light beams received from the beam splitter to be irradiated on different positions of the recording medium, and
the light receiving unit includes a first light receiving unit which receives a reflected light beam from the first lens unit after the light beam has been reflected from the recording medium, and a second light receiving unit which receives a reflected light beam from the second lens unit after the light beam has been reflected from the recording medium.

28. The recording/reproducing apparatus of claim 26, wherein the optical-path adjusting unit further includes:
a polarization adjusting unit configured to receive the light beam from the light source, and output a light beam having a predetermined polarization direction;
a beam splitter configured to output the light beam according to the polarization direction of the light beam outputted from the polarization adjusting unit; and
first and second lens units which enable the light beam received from the beam splitter to be irradiated on different positions of the recording medium.

29. The recording/reproducing apparatus of claim 28, wherein the controller discriminates the recording medium, and controls a voltage signal applied to the polarization adjusting unit according to the discriminated result of the recording medium.

30. The recording/reproducing apparatus of claim 29, wherein the controller controls ON or OFF operation of the voltage signal applied to the polarization adjusting unit.

31. The recording/reproducing apparatus of claim 29, wherein the controller discriminates a type of the recording medium on the basis of the reflected light beam acquired when the recording medium is light-scanned.

32. A recording/reproducing method comprising:
generating a plurality of light beams having different wavelengths, which corresponds to the number of record layers and an interval between the record layers of a recording medium;

irradiating the plurality of light beams on different record layers of the recording medium according to the wavelengths of the light beams;

diffracting the light beams having different wavelengths in different directions according to the wavelengths of the light beams such that focal points of the light beams irradiated on the recording medium are placed on the individual record layers of the recording medium; and recording data in the individual record layers or reproducing the data recorded from the individual record layers, using light beams reflected from the individual record layers, wherein the diffracted light beams are separately received by a plurality of light receiving elements.

33. The method of claim 32, wherein the generating the plurality of light beams includes generating two light beams polarized in different directions;

the irradiating the plurality of light beams includes irradiating the two light beams on the recording medium according to their polarization directions; and the recording or reproducing includes simultaneously recording or reproducing data in the recording medium using the two light beams.

34. The method of claim 33, further comprising:

adjusting light-focusing positions of the two light beams focused on the recording medium.

35. The method of claim 33, further comprising:

receiving either one of the two light beams, and generating a gap-error signal.

36. The method of claim 35, further comprising generating the gap-error signal by receiving a distorted reflected light beam having a distorted polarization direction from among the reflected light beams.

37. The method of claim 36, wherein the gap-error signal is proportional to an interval between a lens unit and the recording medium within a near-field limit.

38. The method of claim 33, further comprising:

forming a near field by using an objective lens and a high-refraction lens having a refraction index higher than that of the objective lens.

39. The method of claim 33, wherein the two light beams polarized in different directions have polarization directions perpendicular to each other.

40. The method of claim 32, wherein the irradiating the plurality of light beams includes discriminating a type of the recording medium, adjusting a polarization direction of the light beam according to the type of the recording medium, and irradiating the adjusted light beam on the recording medium.

41. The method of claim 40, wherein the discriminating a type of the recording medium includes:

focus-scanning the light beam irradiated on the recording medium; and determining a type of the recording medium by using the reflected light beam detected in the focus-scanning process.

42. The method of claim 40, further comprising:

adjusting the polarization direction according to an applied voltage.

43. The method of claim 42, further comprising:

rotating the polarization direction by 90° according to the presence or absence of the applied voltage.

* * * * *